US009855861B2

(12) United States Patent
Supernavage et al.

(10) Patent No.: US 9,855,861 B2
(45) Date of Patent: Jan. 2, 2018

(54) LATERAL SLIDE REMOVABLE SEAT

(71) Applicant: Honda Motor Co., Ltd., Tokyo (JP)

(72) Inventors: Peter A Supernavage, Dublin, OH (US); Fernando A Montijo, Aliso Viejo, CA (US); Jeffrey H Scheurer, II, Columbus, OH (US); Tetsuya Ishikawa, Dublin, OH (US); Spyridon G Blatseas, Dublin, OH (US); Jesus A Diaz Gonzalez, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 63 days.

(21) Appl. No.: 15/063,819

(22) Filed: Mar. 8, 2016

(65) Prior Publication Data

US 2017/0259700 A1  Sep. 14, 2017

(51) Int. Cl.
| | |
|---|---|
| B60N 2/01 | (2006.01) |
| B60N 2/015 | (2006.01) |
| B60N 2/30 | (2006.01) |
| B60N 2/06 | (2006.01) |
| B60N 2/07 | (2006.01) |
| B60N 3/00 | (2006.01) |
| B60N 2/16 | (2006.01) |
| B60N 2/20 | (2006.01) |
| B60N 2/02 | (2006.01) |

(52) U.S. Cl.
CPC .............. *B60N 2/015* (2013.01); *B60N 2/01* (2013.01); *B60N 2/0228* (2013.01); *B60N 2/06* (2013.01); *B60N 2/065* (2013.01); *B60N 2/072* (2013.01); *B60N 2/0715* (2013.01); *B60N 2/0725* (2013.01); *B60N 2/16* (2013.01); *B60N 2/20* (2013.01); *B60N 2/3097* (2013.01); *B60N 3/001* (2013.01)

(58) Field of Classification Search
CPC ............ B60N 2/015; B60N 2/01; B60N 2/06; B60N 2/065; B60N 2/0715; B60N 2/072; B60N 2/0725; B60N 2/16; B60N 2/20; B60N 2/3097; B60N 3/001
USPC ........................................................ 248/429
See application file for complete search history.

(56) References Cited

U.S. PATENT DOCUMENTS 4,509,796 A * 4/1985 Takagi .................... A47C 7/16
297/452.55
5,636,884 A   6/1997 Ladetto et al.
(Continued)

FOREIGN PATENT DOCUMENTS

| DE | 102008012376 A1 | 9/2009 |
| EP | 1060944 A1 | 12/2000 |
| JP | H0999761 A | 4/1997 |

OTHER PUBLICATIONS

International Search Report and Written Opinion for PCT/US2017/021195 dated Jun. 28, 2017.

*Primary Examiner* — Anita M King
(74) *Attorney, Agent, or Firm* — Honda Patents & Technologies North America, LLC; Mark E. Duell

(57) ABSTRACT

A rail and carrier system for first and second removable seats of a motor vehicle is described. The rail and carrier system includes two lower rails fixedly attached to and positioned laterally along a floor of the motor vehicle. Two upper rails are nested with and laterally slidable within each of the lower rails. The rail and carrier system further includes four cross brackets laterally spaced apart and arranged perpendicular to the upper rails, two connecting the left upper rails, and two connecting the right upper rails. Covers are connected to and extend between the cross brackets.

15 Claims, 41 Drawing Sheets

(56) References Cited

U.S. PATENT DOCUMENTS

| | | | |
|---|---|---|---|
| 6,010,195 A * | 1/2000 | Masters | B60N 2/0232 |
| | | | 297/284.11 |
| 6,082,818 A | 7/2000 | Muller | |
| 6,129,405 A | 10/2000 | Miyahara et al. | |
| 6,145,910 A | 11/2000 | Baldas et al. | |
| 6,176,460 B1 | 1/2001 | Kojima et al. | |
| 6,345,856 B1 | 2/2002 | Minai | |
| 6,609,745 B2 | 8/2003 | Miyahara et al. | |
| 6,648,393 B1 | 11/2003 | Milnar et al. | |
| 7,252,319 B2 | 8/2007 | Toyota et al. | |
| 7,677,629 B2 | 3/2010 | Akiya et al. | |
| 7,708,331 B2 | 5/2010 | Yamasaki | |
| 7,748,766 B2 | 7/2010 | Villeminey | |
| 7,992,914 B2 | 8/2011 | Maier et al. | |
| 8,109,577 B2 | 2/2012 | Shao | |
| 8,128,051 B2 * | 3/2012 | Koga | B60N 2/0232 |
| | | | 248/429 |
| 8,245,994 B2 * | 8/2012 | Yamada | B60N 2/073 |
| | | | 248/424 |
| 8,449,011 B2 * | 5/2013 | Jaranson | B60N 2/06 |
| | | | 296/64 |
| 8,851,548 B2 | 10/2014 | Pacolt | |
| 2002/0011737 A1 | 1/2002 | Miyahara et al. | |
| 2006/0220411 A1 | 10/2006 | Pathak et al. | |
| 2009/0230712 A1 | 9/2009 | Maier et al. | |
| 2010/0026033 A1 | 2/2010 | Homier et al. | |
| 2011/0187146 A1 | 8/2011 | Lindsay | |
| 2012/0049589 A1 | 3/2012 | Kyogoku et al. | |
| 2012/0061548 A1 | 3/2012 | Moriyama et al. | |
| 2012/0199719 A1 | 8/2012 | Yamada et al. | |

* cited by examiner

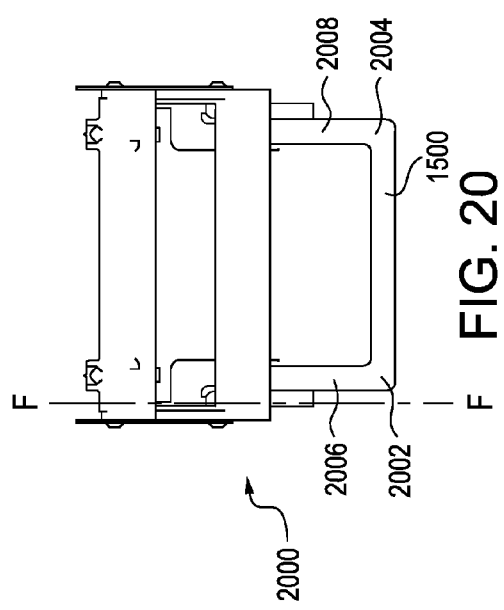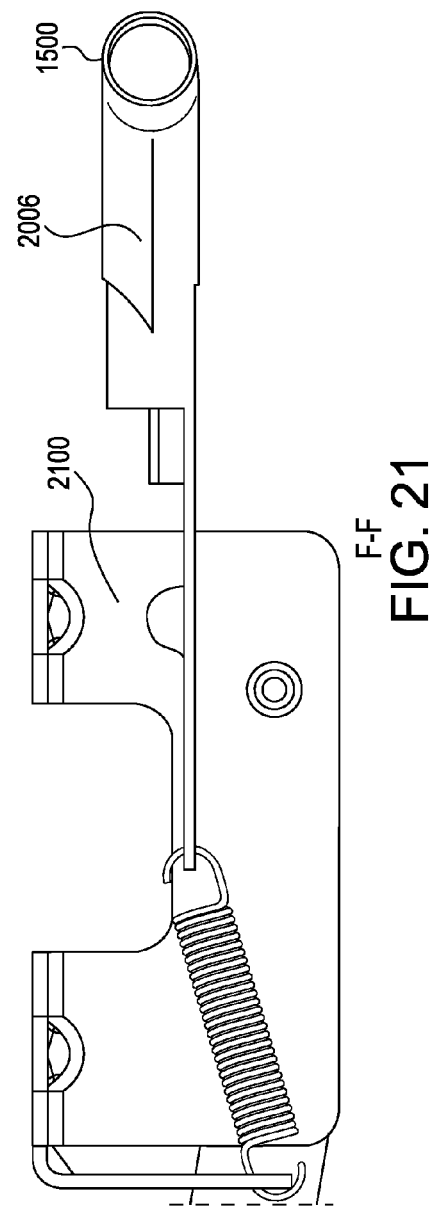

POSSIBLE SEATING POSITIONS

| LH \ RH | 445B | 363B | 281B | 199B | 117B |
|---|---|---|---|---|---|
| -445B | O | O | O | O | O |
| -363B | O | O | O | O | X |
| -281B | O | O | O | X | X |
| -199B | O | O | X | X | X |
| -117B | O | X | X | X | X |

O POSSIBLE SEATING POSITION  
X NOT POSSIBLE SEATING POSITION

FIG. 36

WIDE BENCH MODE

3P BENCH MODE

WIDE MODE

NARROW MODE

NARROW BENCH MODE

CENTERED BENCH MODE

H-H

LATERAL SLIDE REMOVABLE SEAT

TECHNICAL FIELD

The embodiments disclosed a related to the field of removable seats for a motor vehicle.

BACKGROUND

Motor vehicles such as minivans often include three rows of seats. In a minivan, the third row of seats often folds to form a flat floor, but there is no room to stow second row seats when the minivan needs to haul cargo. Therefore, second row seats of a minivan are often removable from the motor vehicle.

In addition to the functional desire to remove the seats, there is also a desire to provide multiple seat configurations for increased user functionality. For instance, a center seat may be removed to provide a center aisle in the vehicle to increase access to the third row of seats. Additionally, the two outer seats have been movable from one position to another by selecting different strikers to which the seat may be attached. Typically, unused strikers are covered by caps or carpeting. Moving a seat from one position to another often was difficult, particularly given the weight of the seat and the need to move or remove caps or carpeting. Therefore, a need for an improved system of configuring the second row seats of a minivan was identified.

Application Summary

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a rail and carrier system for first and second removable seats for a motor vehicle is described. The rail and carrier system includes a first lower rail fixedly attached to and positioned laterally along a floor of the motor vehicle, a first upper rail nested with and laterally slidable within the first lower rail, a second upper rail nested with and laterally slidable within the first lower rail, a second lower rail positioned laterally along the floor of the motor vehicle parallel to the first lower rail and longitudinally rearward of the first lower rail, a third upper rail nested with and laterally slidable within the second lower rail, and a fourth upper rail nested with and laterally slidable within the second lower rail. The rail and carrier system further includes first and second cross brackets laterally spaced apart and arranged perpendicular to the first and third upper rails, the first and second cross brackets being connected to the first and third upper rails, and third and fourth cross brackets laterally spaced apart arranged perpendicular to the second and fourth upper rails, the third and fourth cross brackets being connected to the second and fourth upper rails. A first cover is connected to and extending between the first and second cross brackets, and a second cover connected to and extending between the third and fourth cross brackets.

According to another aspect, a rail and carrier system for first and second removable seats for a motor vehicle is described. The rail and carrier system includes a first lower rail fixedly attached to and positioned laterally along a floor of the motor vehicle, a first upper rail nested with and laterally slidable within the first lower rail and a second upper rail nested with and laterally slidable within the first lower rail. A second lower rail is positioned laterally along the floor of the motor vehicle parallel to the first lower rail and longitudinally rearward of the first lower rail. A third upper rail is nested with and laterally slidable within the second lower rail, and a fourth upper rail is nested with and laterally slidable within the second lower rail. First and second cross brackets are laterally spaced apart and arranged perpendicular to the first and third upper rails, the first and second cross brackets being connected to the first and third upper rails. Third and fourth cross brackets are laterally spaced apart arranged perpendicular to the second and fourth upper rails, the third and fourth cross brackets being connected to the second and fourth upper rails. A first front striker is attached to a top of a longitudinally forward portion of the first cross bracket, and a second front striker is attached to a top of a longitudinally forward portion of the second cross bracket. A first rear striker is attached to a top of a longitudinally rearward portion of the first cross bracket, and a second rear striker is attached to a top of a longitudinally rearward portion of the second cross bracket. A third front striker is attached to a top of a longitudinally forward portion of the third cross bracket, and a fourth front striker is attached to a top of a longitudinally forward portion of the fourth cross bracket. A third rear striker is attached to a top of a longitudinally rearward portion of the third cross bracket, and a fourth rear striker is attached to a top of a longitudinally rearward portion of the fourth cross bracket.

According to yet another aspect, a rail and carrier system for a removable seat for a motor vehicle is described. The rail and carrier system includes a first lower rail fixedly attached to and positioned laterally along a floor of the motor vehicle, a first upper rail nested with and laterally slidable within the first lower rail, a second lower rail positioned laterally along the floor of the motor vehicle parallel to the first lower rail and longitudinally rearward of the first lower rail, a second upper rail nested with and laterally slidable within the second lower rail, first and second cross brackets laterally spaced apart and arranged perpendicular to the first and second upper rails, the first and second cross brackets being connected to the first and second upper rails, and a cover connected to and extending between the first and second cross brackets.

BRIEF DESCRIPTION OF THE DRAWINGS

FIG. 20 is a top view of a towel bar of the slide rail system.

FIG. 21 is a cross-section along line F-F of FIG. 20.

FIG. 36 is a table of an embodiment of seat positions.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments are described with reference to the figures in which like reference numbers indicate identical or functionally similar elements. Also in the figures, the left most digits of each reference number corresponds to the figure in which the reference number is first used.

Figure 1:
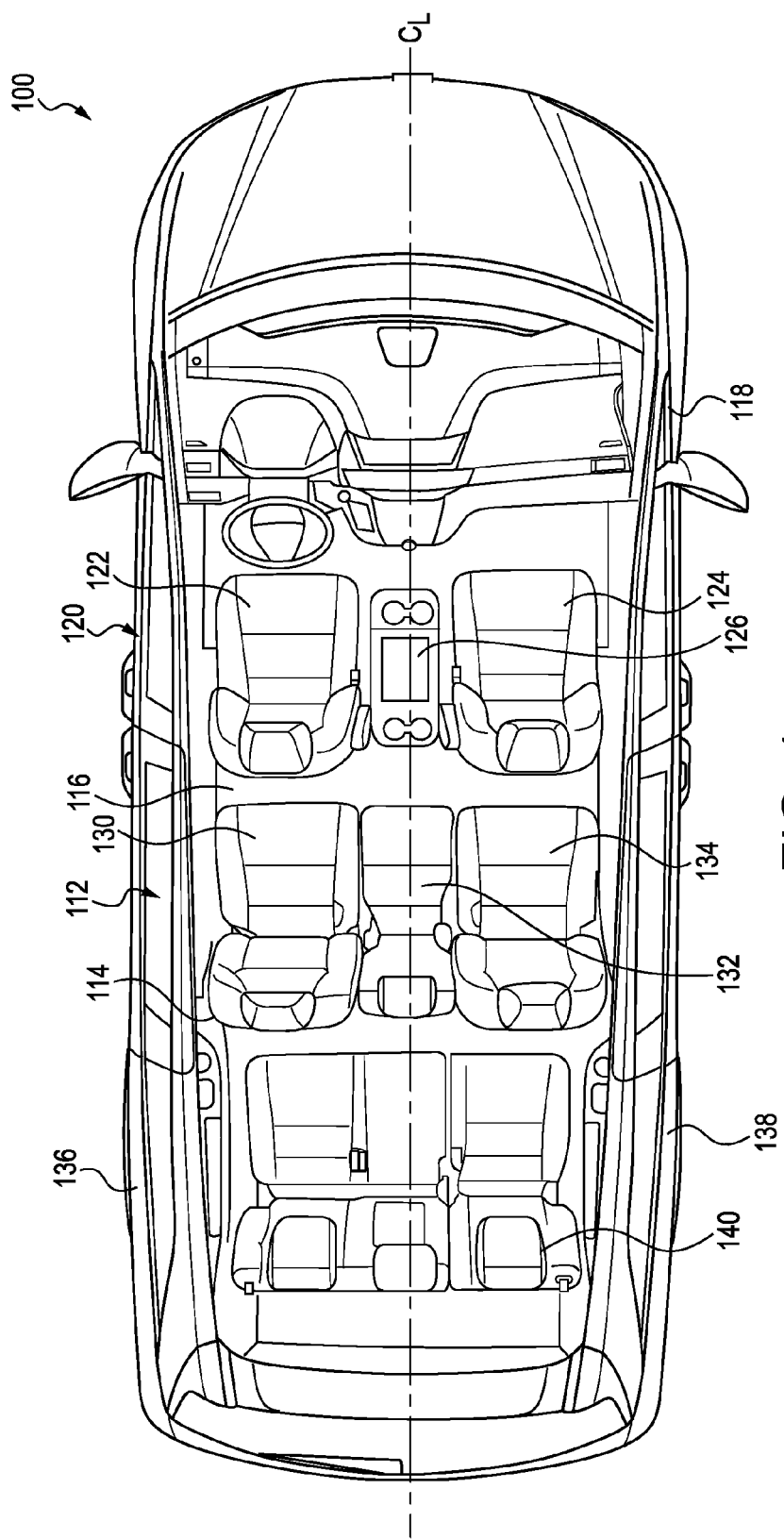
FIG. 1 is a top view of the interior of a motor vehicle.
Figure 2:
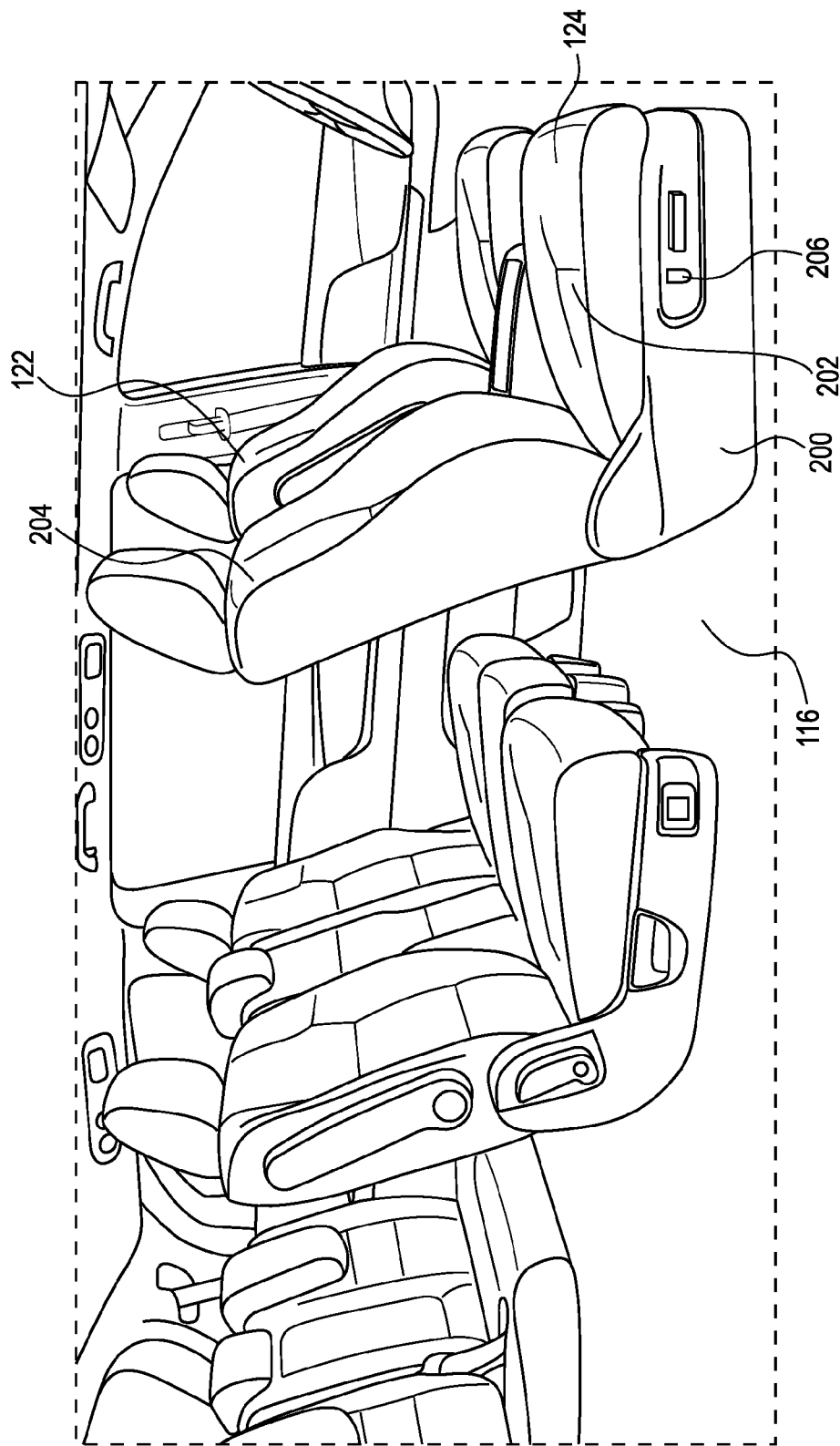
FIG. 2 is a side view of the interior of a motor vehicle.

As illustrated in FIGS. 1-2, the embodiments described herein are directed to a second row seat system 112 for a motor vehicle 100. In the embodiments illustrated in the FIGS. 1-2, the motor vehicle 100 is a minivan, although any other type of vehicle with removable seats 114 may include embodiments of the second row seat system 112.

As illustrated in FIGS. 1-2, the motor vehicle 100 has a floor 116 that is supported by a body 118. As also shown, there is a front row of seats 120. Shown in FIG. 1 are two individual seats 122, 124, with a folding tray 126 that may lower to the side of the passenger seat 124 to create a walkway to the rear of the motor vehicle 100. The bases 200 of the two front seats 122, 124 are fixedly secured the floor 116 of the motor vehicle 100. The seat bases 200 and cushions 202 of each of each of the front seats 122, 124 may be raised and lowered in a vertical direction between a maximum and minimum height, moved forward and rearward longitudinally between a maximum forward and maximum rearward position, and the seatback 204 may be reclined between an upright position to a fully reclined position in manners known to those skilled in the art. For example, these movements may be accomplished mechanically by the seat operator as known in the art, or through actuation of a power switch 206 known in the art.

Located behind the front row of seats 120 is the second row seat system 112. In the embodiment illustrated in FIG. 1, the second row seat system 112 includes a left seat 130, a middle seat 132, and a right seat 134. Each of the three seats 130, 132, 134 is removable from the motor vehicle 100, as will be discussed. When the middle seat is removed 132, the left seat 130 and right seat 134 are additionally slidable laterally as discussed herein.

Figure 3:
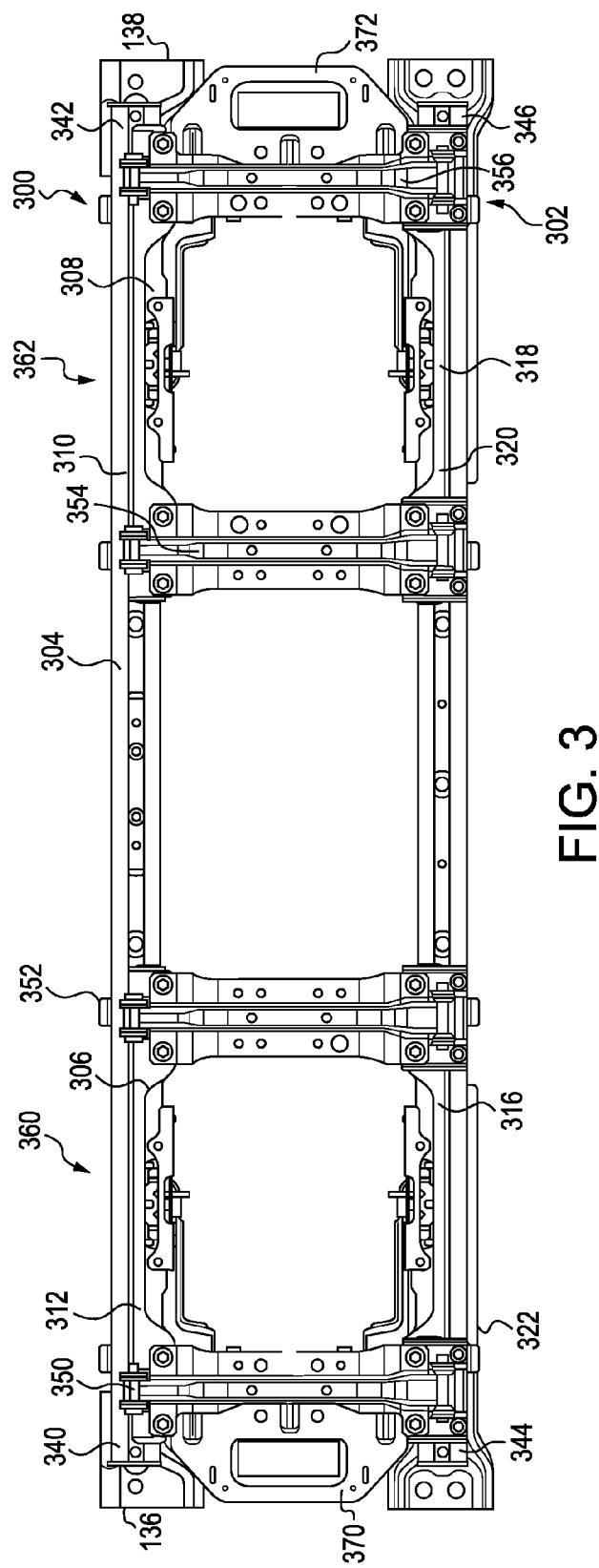
FIG. 3 is a top view of a slide rail system.

The left and right seats 130, 134 are supported on a front rail system 300 and a rear rail system 302 that extend laterally across the floor 116 between the left side 136 of motor vehicle 100 and the right side 138 of the motor vehicle 100 that are illustrated in FIG. 3.

The front rail system 300 includes a front lower rail 304 mounted laterally across the motor vehicle 100 within and spanning the entire width of the floor 116. The front lower rail 304 is generally U-shaped, with the ends 400, 402 folded inwardly and then downwardly, creating a U-shaped cross sectional profile with a generally open center portion 404 and two substantially, but not completely closed upper portions 406, 408.

The front rail system 300 further includes two front upper rails 306, 308 that are nested within the portions of the front lower rail 304. Each of the front upper rails 306, 308 have a lower portion 410 that has a cross section that is generally UU-shaped, with the inner ends 412, 414 of the UU-cross section being connected, and the outer ends 416, 418 of the UU-cross section being nested through the openings 420, 422 and in the upper portions 406, 408 of the front lower rail 304. Rollers 424, 426 are connected to the outer ends 416, 418 of each of the front upper rails 306, 308. The rollers 424, 426 are positioned to engage the closed upper portions 406, 408 of the front lower rail 304. The rollers 424, 426 are oriented in a lateral direction to enable each of the front upper rails 306, 308 to slide laterally within the front lower rail 304.

The inner ends 412, 414 of the UU-cross section of each front upper rail 306, 308 extend upwardly beyond the height of the outer ends 416, 418 of the UU-cross section. The inner ends 412, 414 are either connected to or formed integrally with each other. Further, the inner ends 412, 414 are either connected to or formed integrally with an upper portion 310, 312 of each of the front upper rails 306, 308. Connections may be made by known methods, including, but not limited to, welding, mechanical connections such as rivets, or any other method known to one skilled in the art.

The rear rail system 302 includes a rear lower rail 314 mounted laterally across the motor vehicle 100, spanning the entire width of the floor 116. The rear lower rail 314 is generally U-shaped, with the ends 430, 432 folded inwardly and then downwardly, creating a U-shaped cross sectional profile with a generally open center portion 434 and two substantially, but not completely closed upper portions 436, 438.

The rear rail system 302 further includes two rear upper rails 316, 318 that are nested within the portions 436, 438 of the rear lower rail 314. Each of the rear upper rails 316, 318 are have a generally UU-shaped cross section, with the inner ends 442, 444 of the UU-cross section being connected, and the outer ends 446, 448 of the UU-cross section being nested through the openings 450, 452 and in the upper portions 436, 438 of the rear lower rail 314. Rollers 454, 456 are connected to the outer ends 446, 448 of each of the rear upper rails 316, 318. The rollers 454, 456 are positioned to engage the closed upper portions 436, 438 of the rear lower rail 314. The rollers 454, 456 are oriented in a lateral direction to enable each of the rear upper rails 316, 318 to slide laterally within the rear lower rail 314.

The inner ends 442, 444 of the UU-cross section of each rear upper rail 316, 318 extend upwardly beyond the height of the outer ends 446, 448 of the UU-cross section. The inner ends 442, 444 are either connected to or formed integrally with each other. Further, the inner ends 442, 444 are either connected to or formed integrally with an upper portion 320, 322 of each of the rear upper rails 316, 318. Connections may be made by known methods, including, but not limited to, welding, mechanical connections such as rivets, or any other method known to one skilled in the art. The upper portions 310, 312, 320, 322 of each of the front and rear upper rails 306, 308, 316, 318 extend the lateral length of each of the front and rear upper rails 306, 308, 316, 318.

Rail covers 460, 462 extend from a left lateral end 340, 344 of the front and rear lower rails 304, 314 to the right end 342, 346 of the front and rear lower rails 304, 314. The rail covers 460, 462 are made of a flexible plastic polymer with a slit 464 down the middle that extends from the left lateral end 340, 344 to the right lateral end 342, 346 of the front and rear lower rails 304, 314. The inner ends 412, 414, 442, 444 of the UU-Cross section of the upper rails 306, 308, 316, 318 extend through up through the slit 464. The upper rails 306, 308, 316, 318 are free to move laterally, with the flexible material of the rail covers 460, 462 flexing around the inner ends 412, 414, 442, 444 of the UU-cross section of the upper rails 306, 308, 316, 318 move laterally through the slit 464 in the rail cover 460, 462. The rail covers 460, 462 act to prevent large debris from being introduced into the lower rails 304, 314 that may interfere with the lateral movement of the upper rails 306, 308, 316, 318.

The front and rear upper rails 306, 308, 316, 318 on the same side of the motor vehicle 100 are connected by cross brackets 350, 352, 354, 356. In the embodiment illustrated in FIG. 3, two cross brackets 350, 352, 354, 356 extend from the opposite ends of each of the upper portions 310, 312, of the front upper rails 306, 308 to the corresponding opposite ends of the each of the upper portions 320, 322 of the rear upper rails 316, 318. The cross brackets 350, 352, 354, 356 may be connected to the upper portions 310, 312, 320, 322 of the upper rails 306, 308, 316, 318 may any known means such as nut and bolt fasteners, rivets, welds, and the like. Each of the cross brackets 350, 352, 354, 356, front upper rail 306, 308 and rear upper rail 316, 318 that are connected in a square-like manner when viewed from above form a left sliding carrier 360 and a right sliding carrier 362.

Each of the cross brackets 350, 352, 354, 356 include a front striker 470 and a rear striker 472. Each front striker 470 is positioned above the upper portion 310, 312 of the front upper rail 306, 308. Each rear striker 472 is positioned above the upper portion 320, 322 of the rear upper rail 316, 318. The strikers 470, 472 allow for the removable seats 114 to be attached to the front rail system 300 and rear rail system 302.

Figure 5:
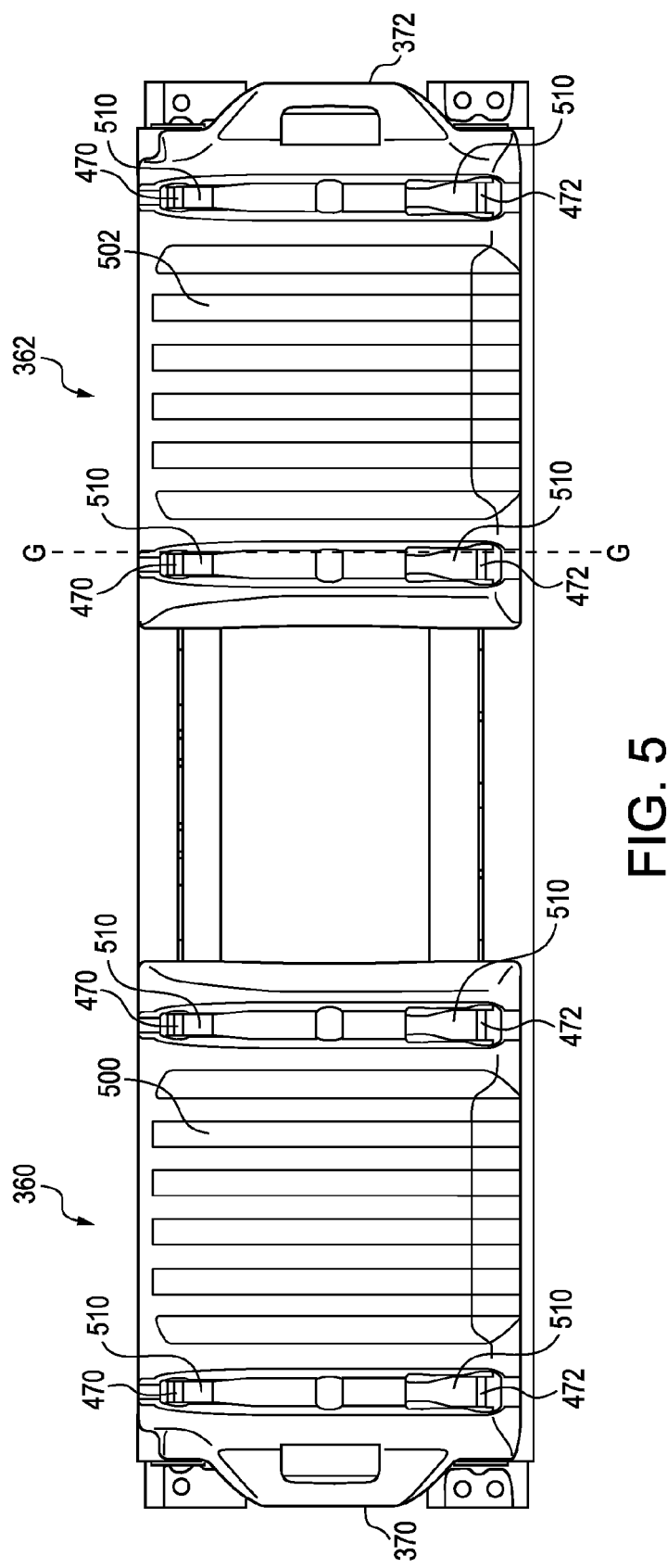
FIG. 5 is a top view of a slide rail system.
Figure 7:
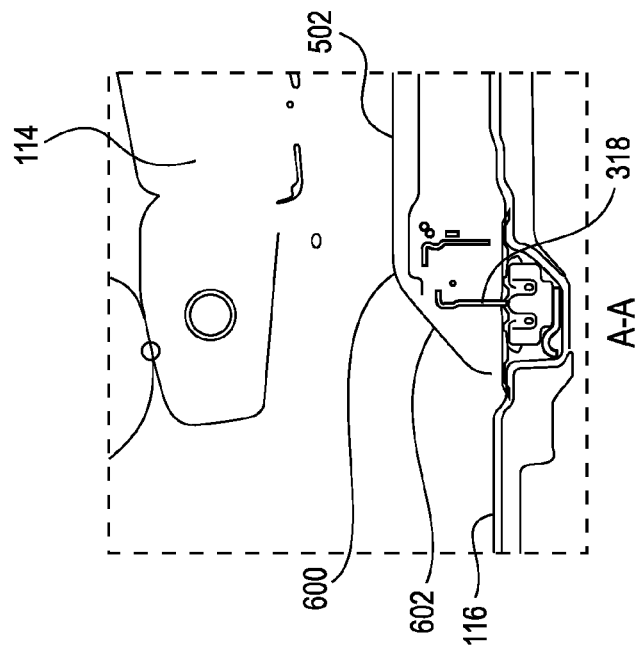
FIG. 7 is a cross-section along line A-A of FIG. 6.
Figure 6:
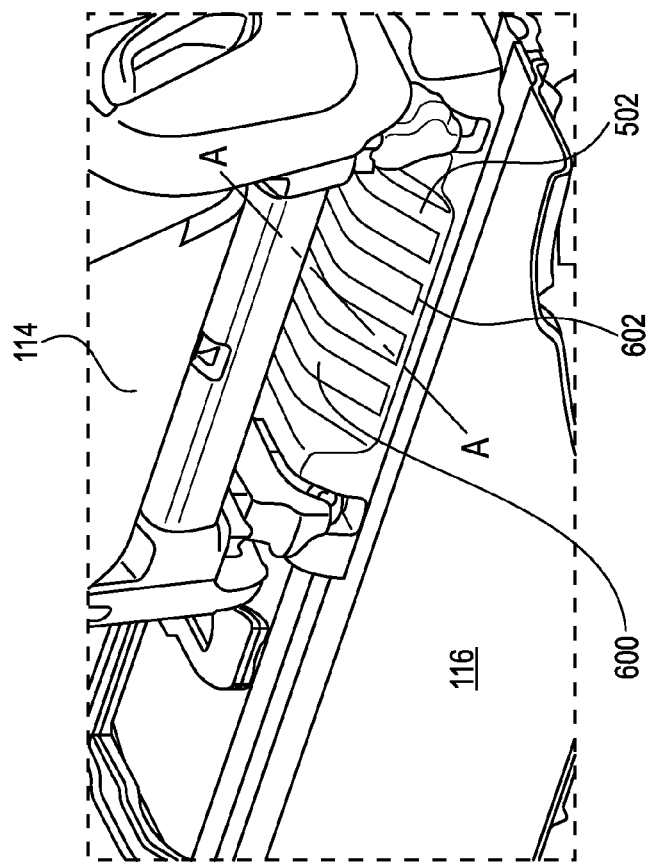
FIG. 6 is a perspective view of an embodiment of a lateral slide removable seat.

As illustrated in FIG. 5, the left sliding carrier 360 further includes a left cover 500. The left cover 500 covers the entire left sliding carrier 360 with the exception of four openings 510 that leave the four strikers 470, 472 of the left sliding carrier 360 exposed. The right sliding 362 carrier further includes a right cover 502. The right cover 502 covers the entire right sliding carrier 502 with the exception of four openings 510 that leave the four strikers 470, 472 of the right sliding carrier 502 exposed.

Figure 9:
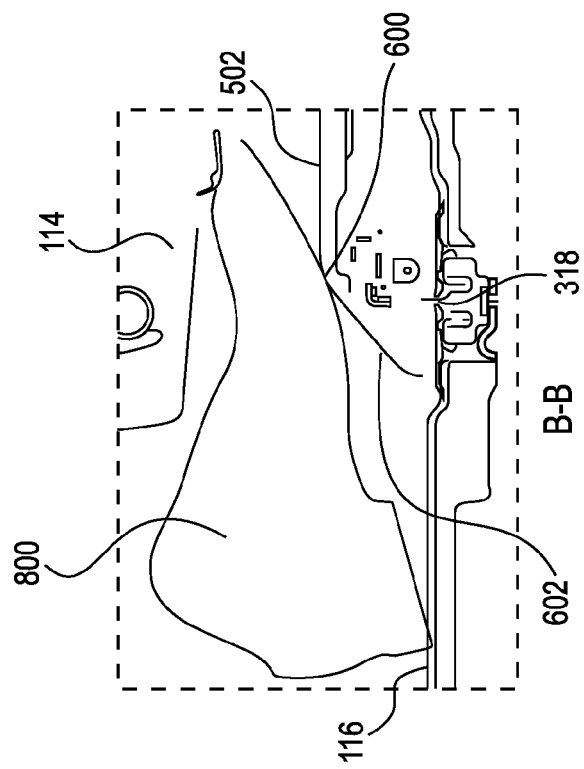
FIG. 9 is a cross-section along line B-B of FIG. 8.
Figure 8:
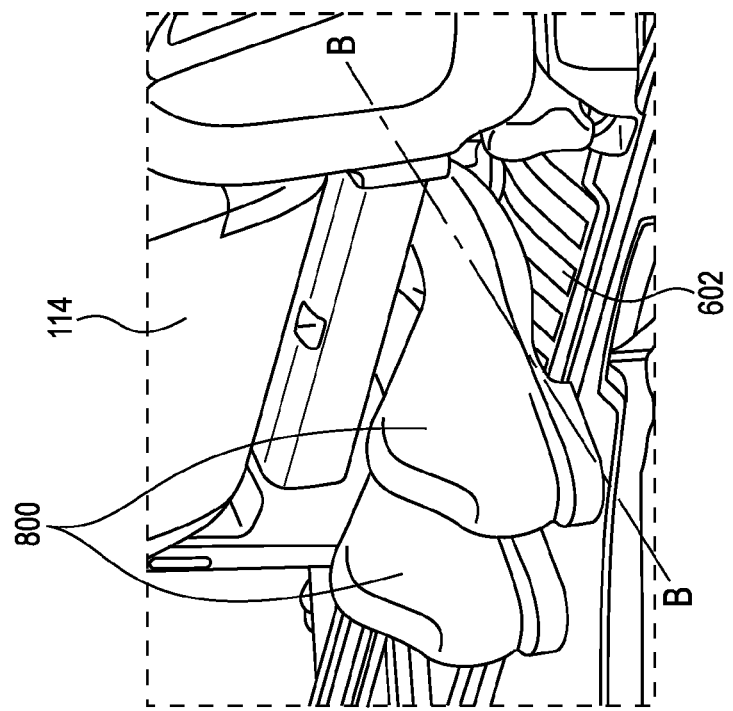
FIG. 8 is a perspective view of an embodiment of a lateral slide removable seat.

The left cover 500 and right cover 502 are horizontally flat. As illustrated in FIGS. 6-9, at a longitudinally rearward position 600 generally above the rear upper rail 316, 318 of each sliding carrier 360, 362, the covers 500, 502 each gradually slope downward in a vertical and rearward direction to a height generally equal to that of the floor 116. The sloped angle of the cover 500, 502 allows cargo to be loaded into the motor vehicle 100 from the rear of the motor vehicle 100 without damaging the cover 500, 502. Additional, the sloped angle of the rearward portion 602 of the cover 500, 502 provides additional leg room for a passenger sitting in a third row of seats 140 in the motor vehicle 100 behind the removable seat 114 by providing extra room for shoes 800, as illustrated in FIGS. 8-9.

Figure 10:
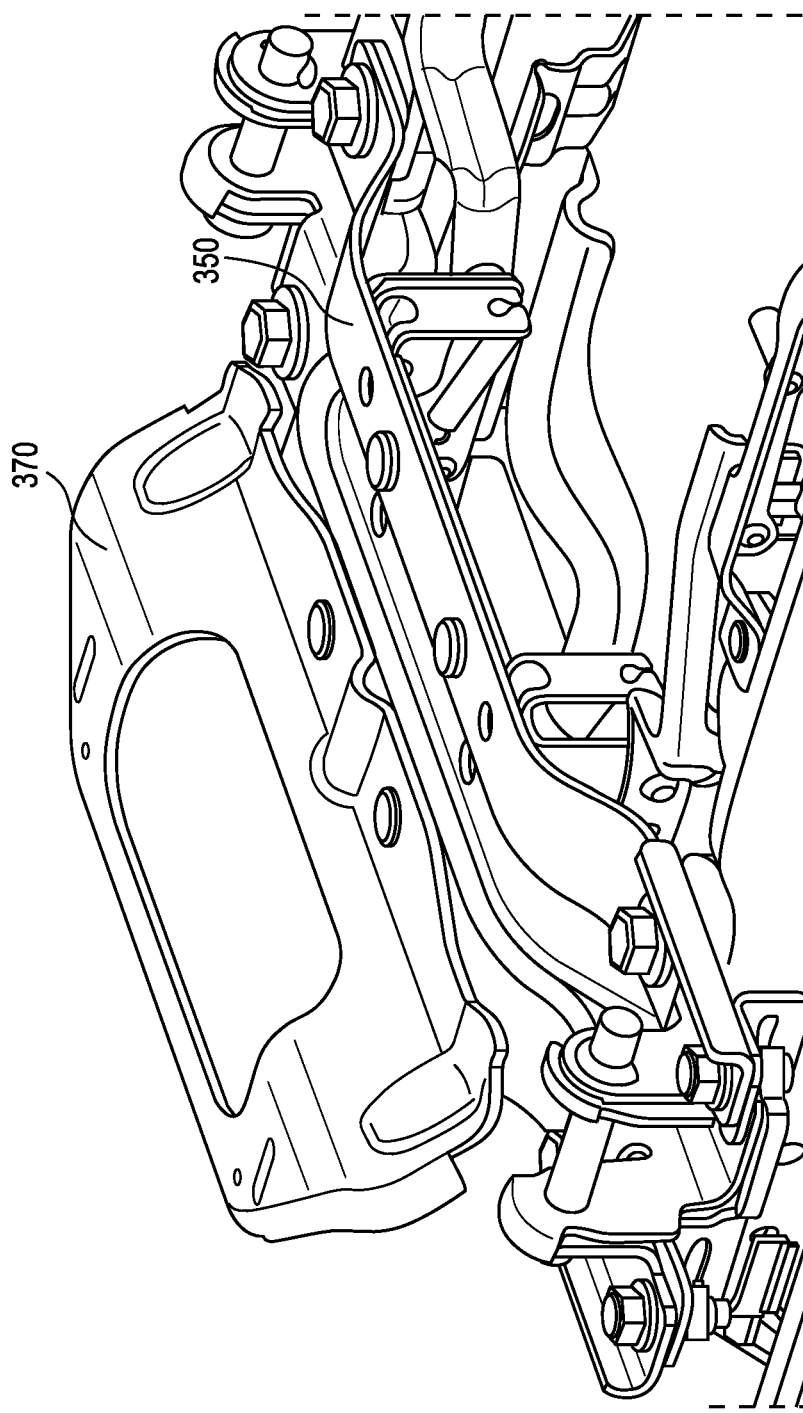
FIG. 10 is a perspective view of an embodiment of a cross bracket and handle.
Figure 11:
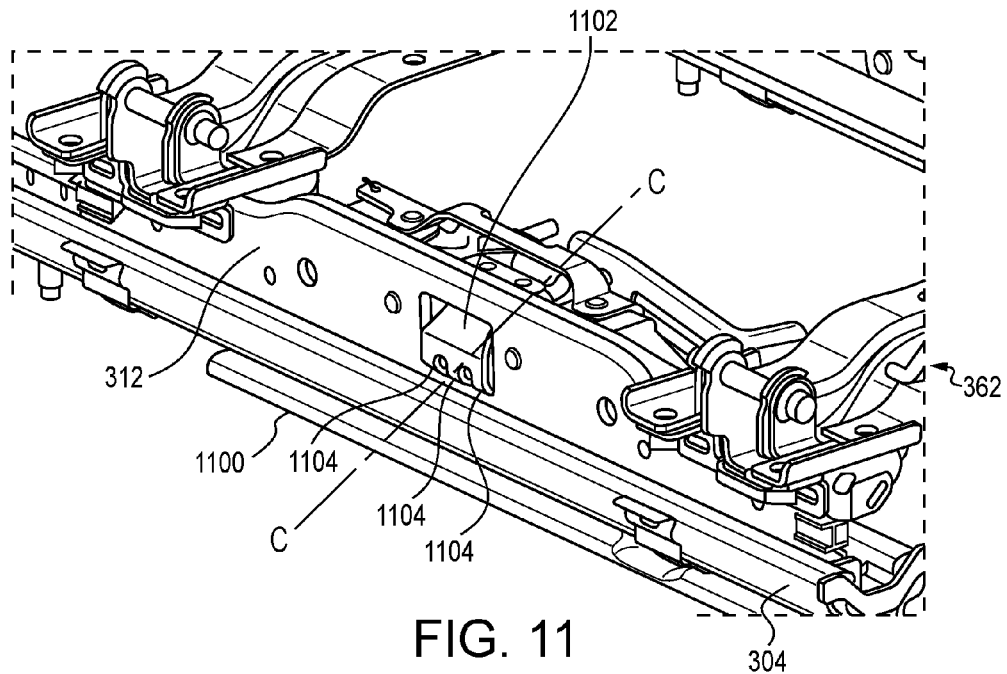
FIG. 11 is a perspective view of an embodiment of a locking mechanism.
Figure 12:
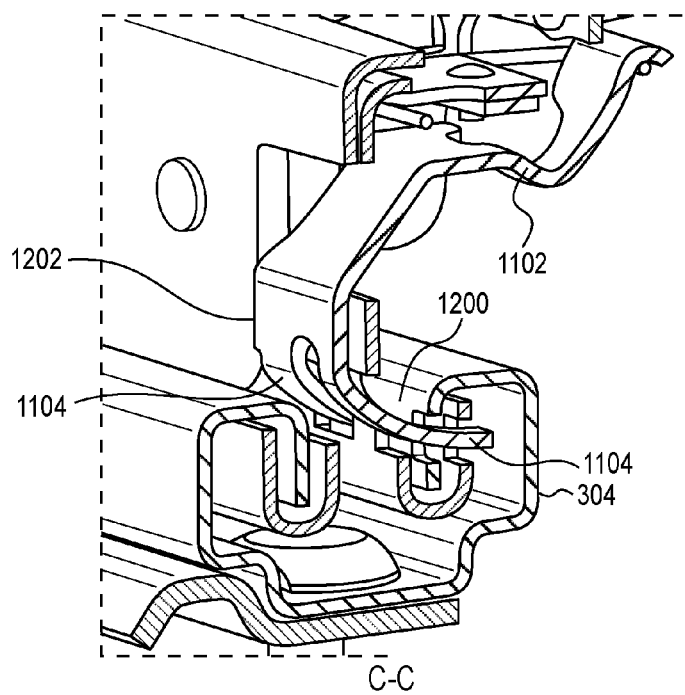
FIG. 12 is a cross-section along line C-C of FIG. 11.
Figure 13:
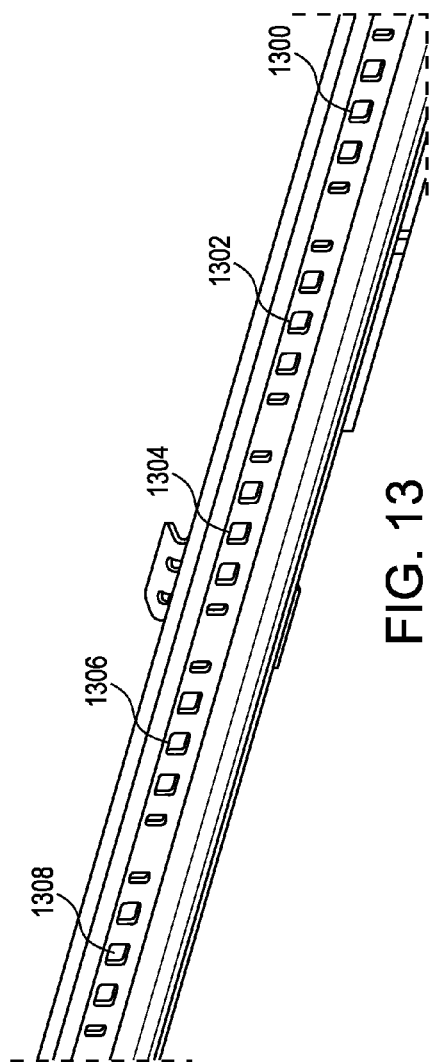
FIG. 13 is a portion of an embodiment of a lower rail.

The left sliding carrier 360 further includes a handle 370 that is attached to the laterally outward left cross bracket 350 as shown in FIG. 10. The right sliding carrier 362 also includes a handle 372 that is attached to the laterally outward right cross bracket 356 in a manner the same as the left handle 370 shown in FIG. 10. The handles 370, 372 are not covered by the covers 500, 502 of the sliding carriers 360, 362.

The following embodiments are going to be described with respect to the right sliding carrier 362. In each situation, the left sliding carrier 360 features the same described embodiment.

Figure 14:
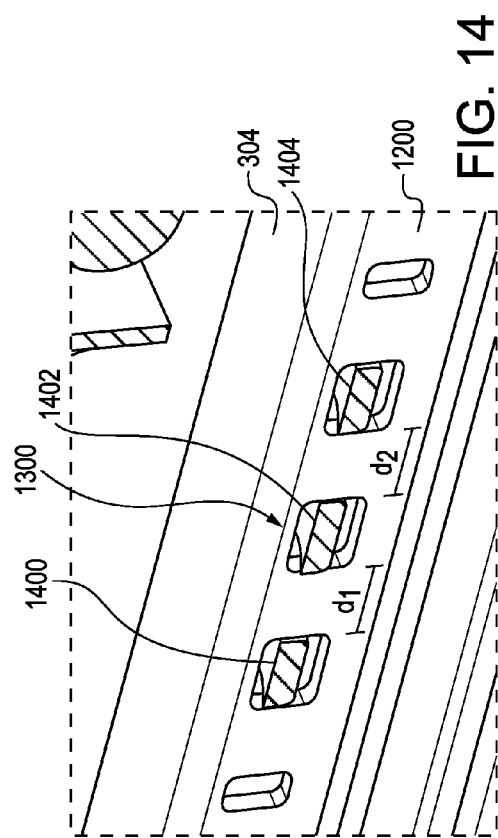
FIG. 14 is a close-up of a portion of FIG. 13.
Figure 15:
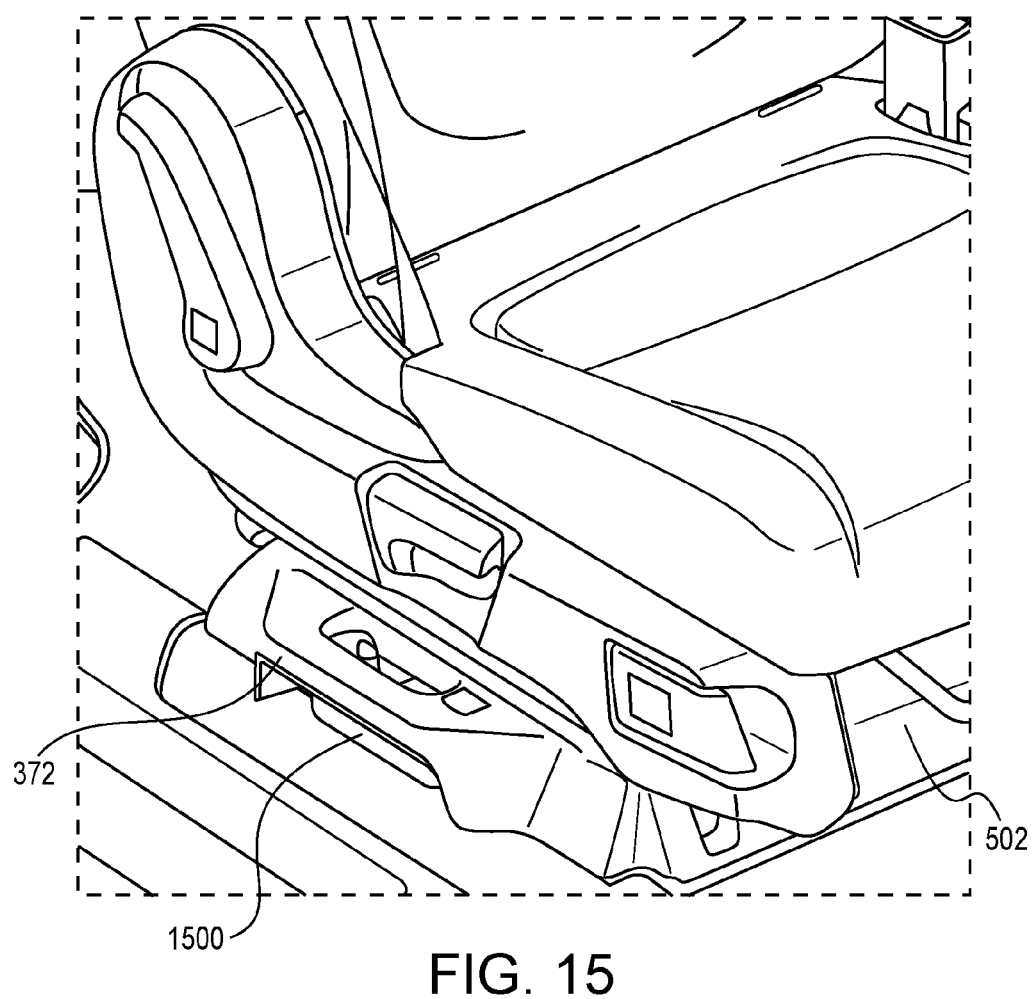
FIG. 15 is a forward perspective view of an embodiment of a removable seat.
Figure 16:
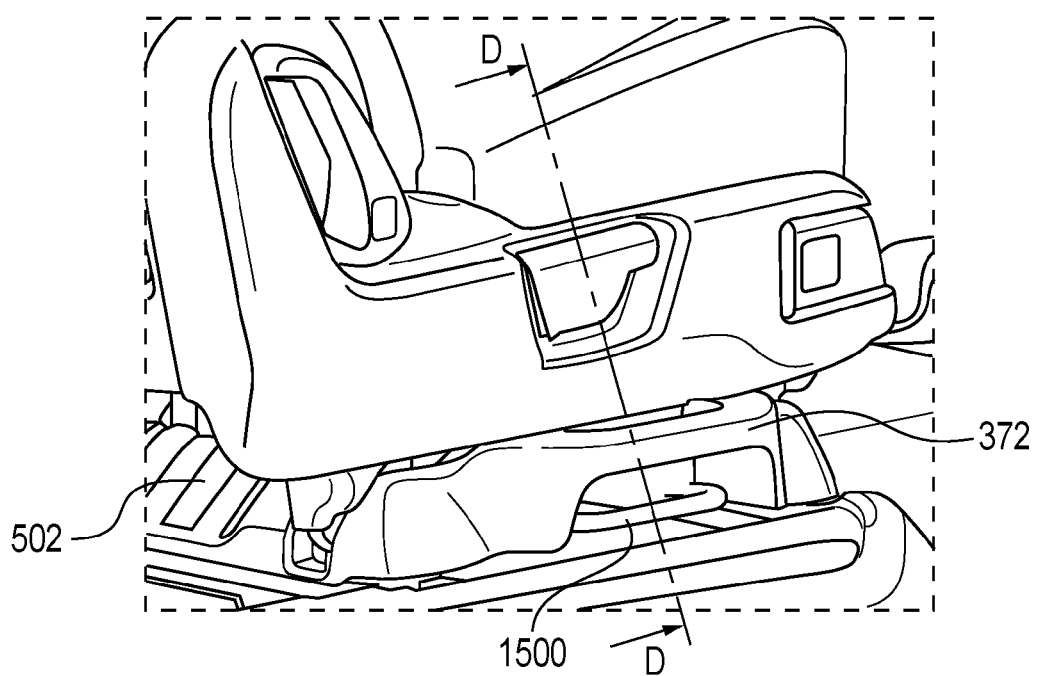
FIG. 16 is a side perspective view of the embodiment of FIG. 15.
Figure 17:
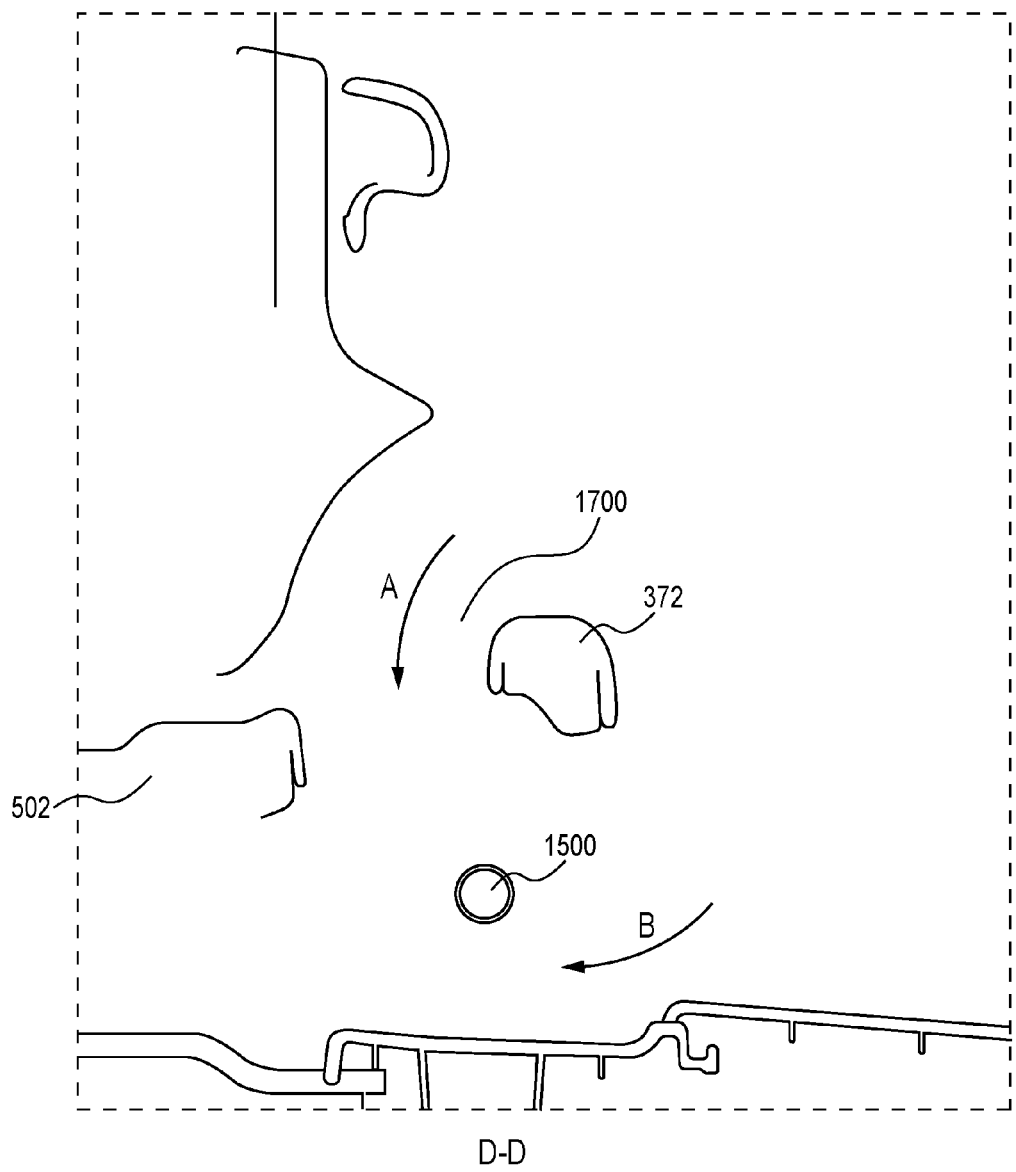
FIG. 17 is a cross-section along line D-D of FIG. 16.
Figure 18:
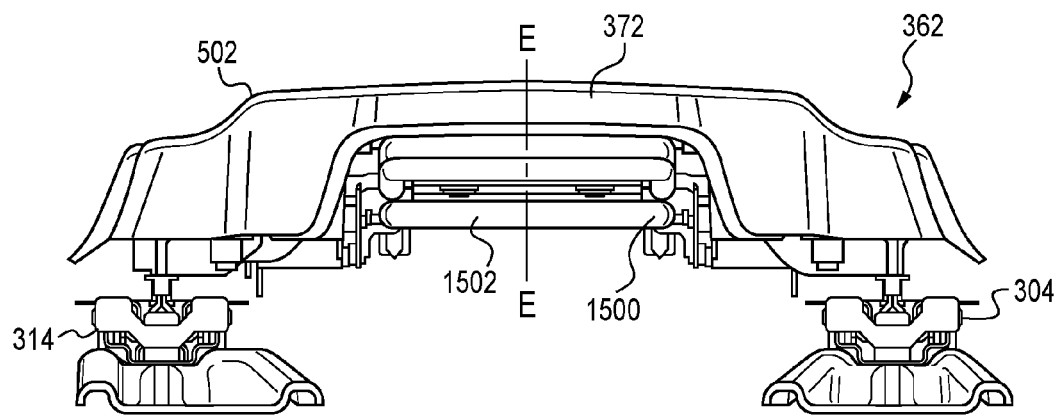
FIG. 18 is a side view of the slide rail system.

The sliding carrier 362 includes a lock mechanism 1100 for locking the sliding carrier 362 into place. In the embodiment illustrated in FIGS. 11-14, the front lower rail 304 includes five (5) sets of three (3) holes 1300, 1302, 1304, 1306, 1308 located in an inner wall 1200 of the front lower rail 304 that are spaced to the right laterally from a longitudinal centerline CL of the motor vehicle 100 for use with the right sliding carrier 362, and an additional five (5) sets of three (3) holes (not shown) located in the inner wall 1200 of the front lower rail 304 that are spaced to the left laterally from the longitudinal centerline CL of the motor vehicle 100 for use with the left sliding carrier 360. Each set of three (3) holes 1300, 1302, 1304, 1306, 1308 is spaced laterally apart from each other and correspond to a locking position of the sliding carrier 362. Within each set of three (3) holes 1300, 1302, 1304, 1306, 1308, as illustrated in FIG. 14 with respect to the first set of the three (3) holes 1300, the distance $d_1$ between the first hole 1400 and second hole 1402 is the same as the distance $d_2$ between the second hole 1402 and the third hole 1404. Each set of three (3) holes 1300, 1302, 1304, 1306, 1308 that make up each set of five (5) holes on each side of the front lower rail 304 are similarly constructed.

Located in the upper portion 310, 312 of the front upper rail 306, 308 of each of the sliding carriers 360, 362 is a lock 1102. The lock 1102, when viewed from the side in FIG. 12, has a generally C-shaped cross section. The lower portion 1202 of the lock 1102 includes three locking member extensions 1104. The three locking member extensions 1104 correspond with and fit into the three (3) sets of holes 1300, 1302, 1304, 1306, 1308 in the lower rail 304 and lock the sliding carrier 362 into place. A spring (not shown) biases the lock 1102 and locking member extensions 1104 against the inner wall 1200 of the upper front rail 304. As the sliding carrier 362 slides along the upper front rail 304, the locking member extensions 1104 are forced into a set of three (3) holes 1300, 1302, 1304, 1306, 1308 when the three locking member extensions 1104 come into alignment with one of the sets of three (3) holes 1300, 1302, 1304, 1306, 1308.

Figure 19:
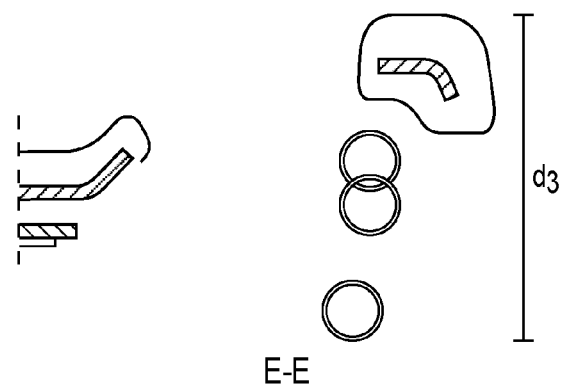
FIG. 19 is a cross-section along line E-E of FIG. 18.
Figure 22:
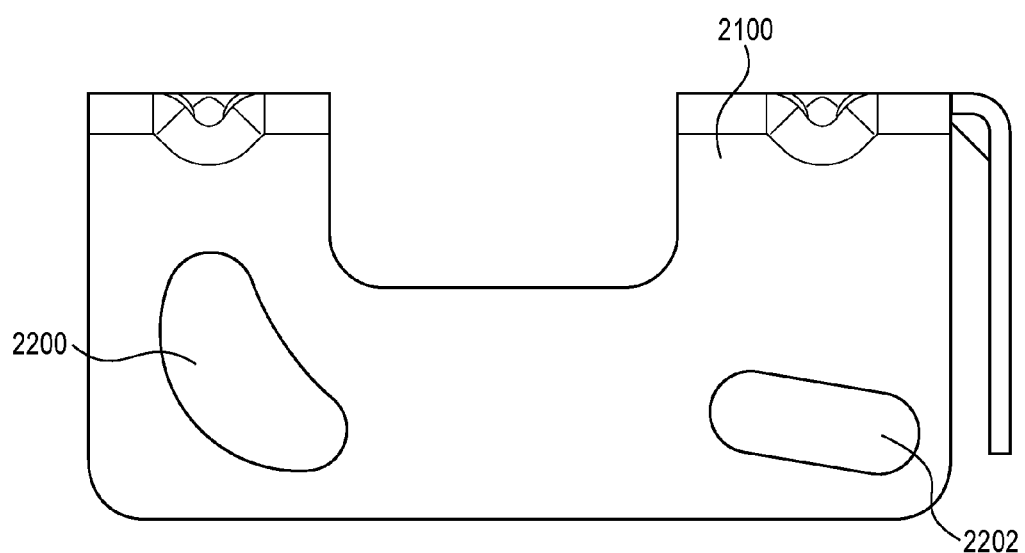
FIG. 22 is a side view of an embodiment of a towel bar bracket.

As illustrated in FIGS. 15-19, beneath the handle 372 is located a towel bar 1500 used to unlock the lock mechanism 1100 of the sliding carrier 362, which allows the sliding carrier 362 to slide back and forth along the lower rails 304, 314. The grip 1502 of the towel bar 1500 is located underneath the handle 372 that extends from the sliding carrier 362. The towel bar 1500 is ergonomically positioned such that it is equally accessible from above, illustrated by arrow A, through the opening 1700 in the handle 372 or from below, illustrated by arrow B, underneath the handle 372. The towel bar 1500, from either direction, as illustrated by arrow A and arrow B, may be actuated with the normal grip movement of an adult. Additionally, the towel bar 1500 location is designed to not be operable by a small child to prevent accidental actuation of the towel bar 1500 and release of the locking mechanism 1100 by a small child. The span $d_3$ of the grip in the embodiment illustrated in FIG. 19 is 65.5 mm, which exceeds the maximum grip of a 97th percentile 5-year old child.

As illustrated in FIGS. 20-26, the towel bar mechanism 2000 includes the towel bar 1500 that is gripped by the user. The ends 2002, 2004 of the towel bar 1500 are each connected to a perpendicular bar 2006, 2008 that extends beneath the cover 502. The perpendicular bars 2006, 2008 are in turn connected to the lock mechanism 1100. When actuated, the towel bar 1500 releases the lock 1102 from one of sets of three (3) holes 1300, 1302, 1304, 1306, 1308, thereby allowing the sliding carrier 362 and the seat 134 on top thereof to slide back and forth laterally along the front and rear lower rails 304, 314.

The perpendicular bars 2006, 2008 each have a first pin 2400 and a second pin 2402 that fit within a bracket 2100 that limit their motion. The bracket 2100 has a first opening 2200 and second opening 2202 that receive the first pin 2400 and second pin 2402 respectively. The second opening 2202 is an angled oval opening. The angle of the second opening 2202 is upward in the laterally outward direction in the direction of arrow C. The second pin 2402 in the second opening 2202 also acts as the rotation point for the perpendicular bars 2006, 2008 as the towel bar 1500 is lifted outward and upward.

Figure 25:
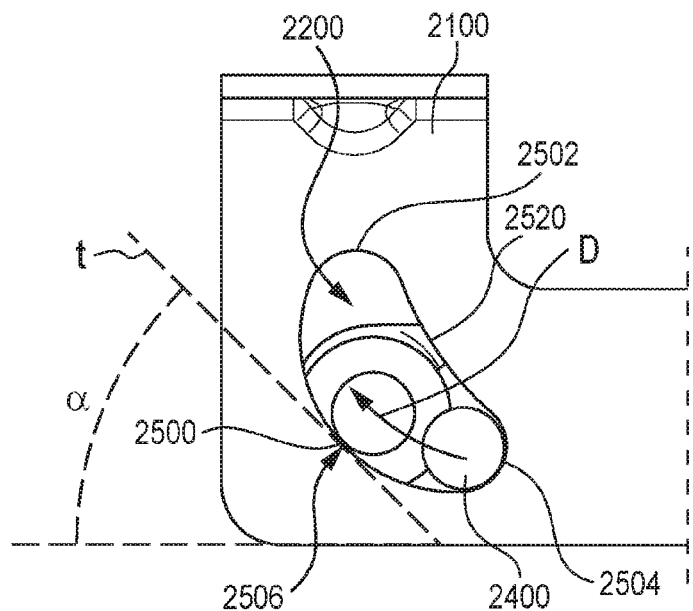
FIG. 25 is a close up of Part B of FIG. 24.
Figure 26:
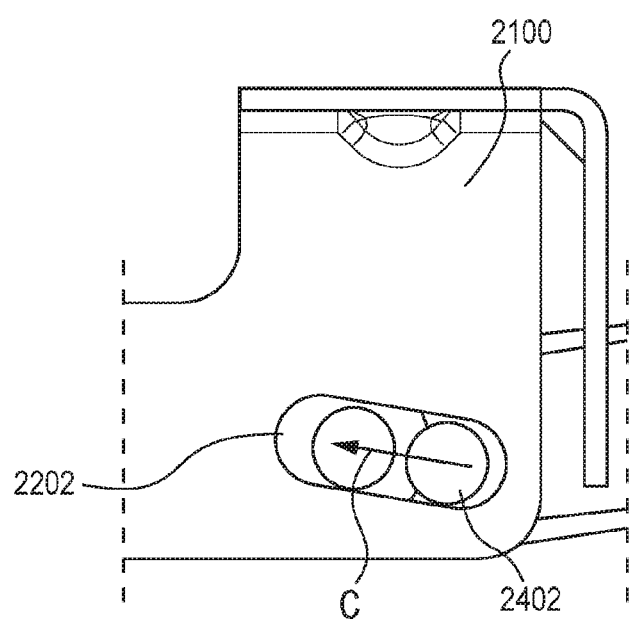
FIG. 26 is a close up of Part C of FIG. 24.

FIG. 25 is an expanded view of the first opening 2200, which is the shape of a relatively obtuse triangle with rounded rather than sharp corners 2500, 2502, 2504. One side is an obtuse rounded corner 2500. A tangent t drawn at the apex 2506 of the obtuse rounded corner 2500 is an angle α. In the embodiment illustrated in FIG. 25, the angle α is 45°. The side 2520 opposite the obtuse rounded corner 2500 may have a very slight arcuate shape. The first pin 2400 in the first opening 2200 operates to force the towel bar 1500 to move outward and upwardly when actuated. The shape of the opening 2200 is tuned to insure the motion path of the pin 2400 towel bar 1500 is fluid, as illustrated by arrow D.

The upward and outward motion of the towel bar 1500 causes the laterally inward ends 2404 of the perpendicular bars 2006, 2008 to move outward and upward. Locking bars 2406 are rotationally connected by the second pin 2402 to the inward ends 2404 of the perpendicular bars 2006, 2008. The outward and upward motion causes the locking bars 2406 to move outward and downward. The downward motion acts to pull the spring-biased locking mechanism 1100, which is connected to the locking bars 2406, out of one of the sets of three (3) holes 1300, 1302, 1304, 1306, 1308.

Figure 23:
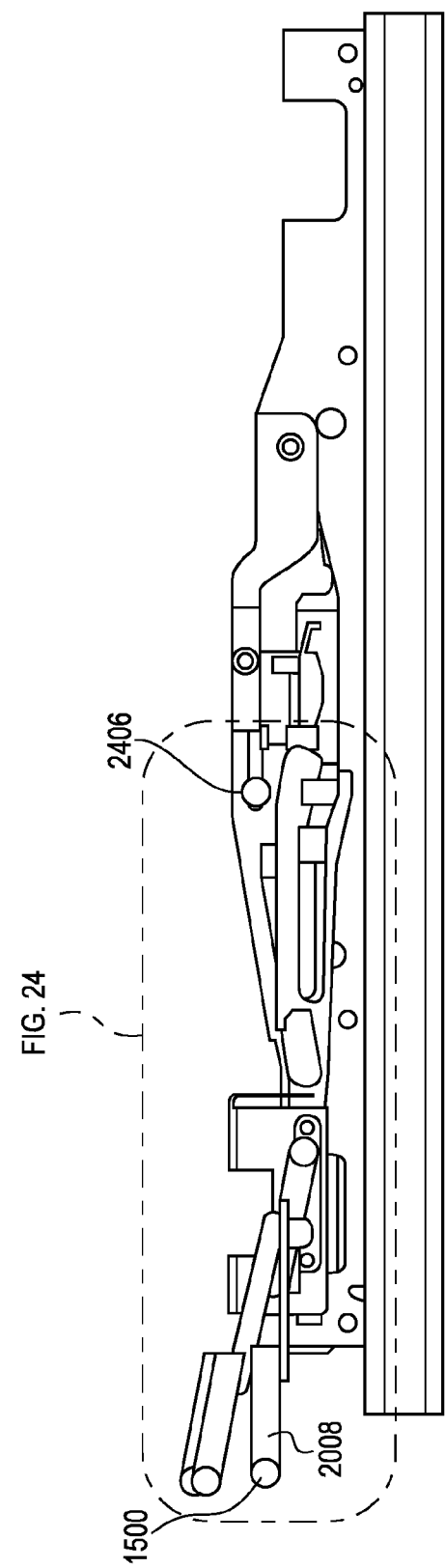
FIG. 23 depicts the operation of the embodiment of the towel bar.
Figure 24:
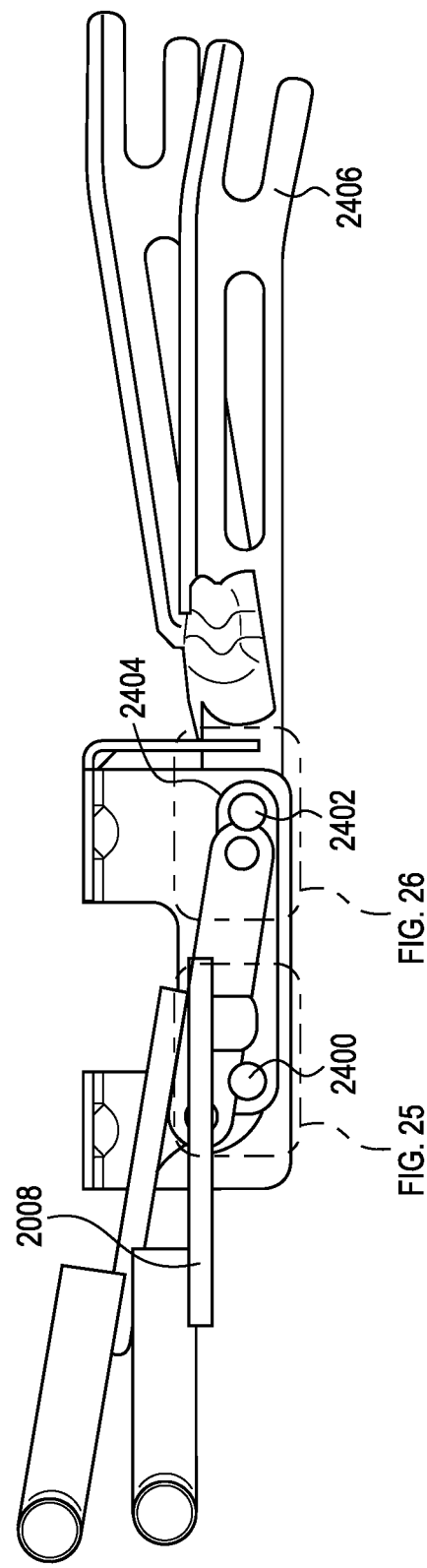
FIG. 24 is a close up of Part A of FIG. 23.

By limiting the motion of the towel bar 1500, the towel bar 1500 can be controlled to move in an ergonomically advantageous motion by requiring the towel bar 1500 to move outward and upward consistent with the closing grip motion of the user. The limited movement of the towel bar 1500, particularly the inability of the towel bar 1500 to move laterally inward, helps to prevent the lock mechanism 1100 from being unlocked in a side impact, as illustrated in FIG. 23, because the locking bar 2406 is prevented from lowering unless the towel bar 1500 moves outward and upward, which is opposite of motion caused by a side impact.

Figure 27:
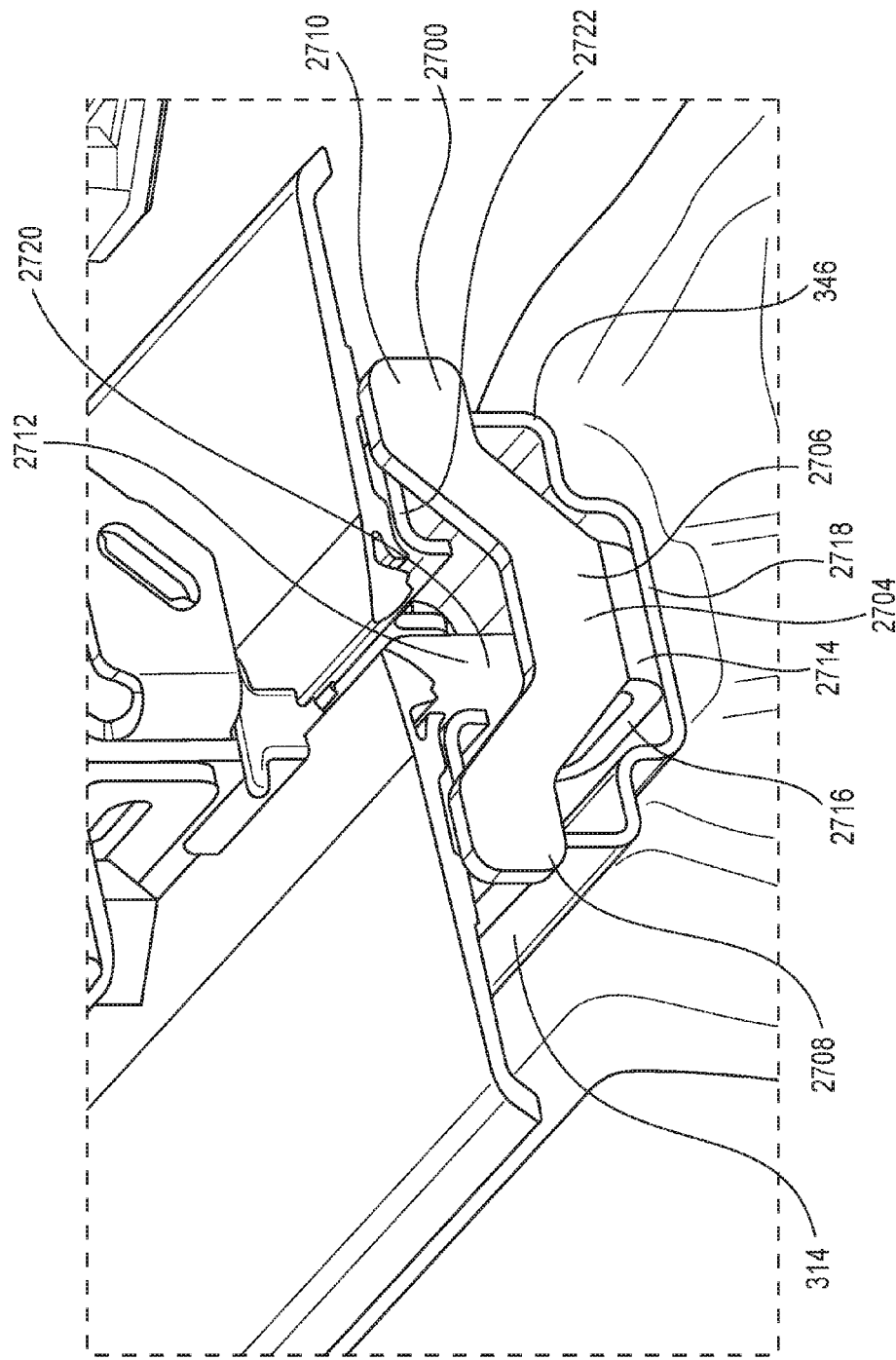
FIG. 27 is a side perspective view of the end of an embodiment of the rail system.
Figure 28:
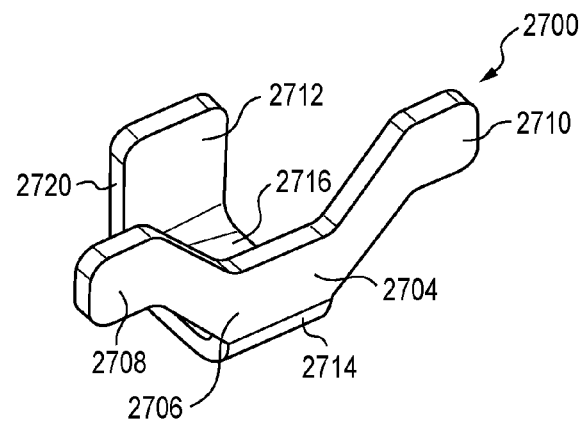
FIG. 28 is a perspective view of an embodiment of a rail end bracket.
Figure 29:
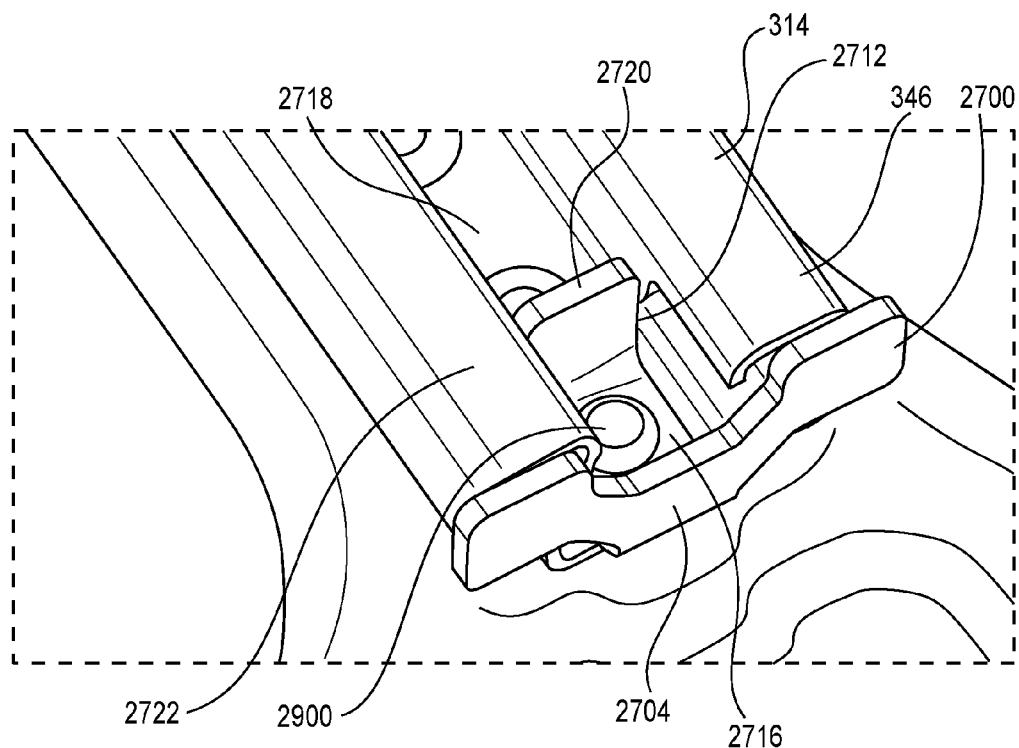
FIG. 29 is a top perspective view of the end of an embodiment of the rail system.
Figure 30:
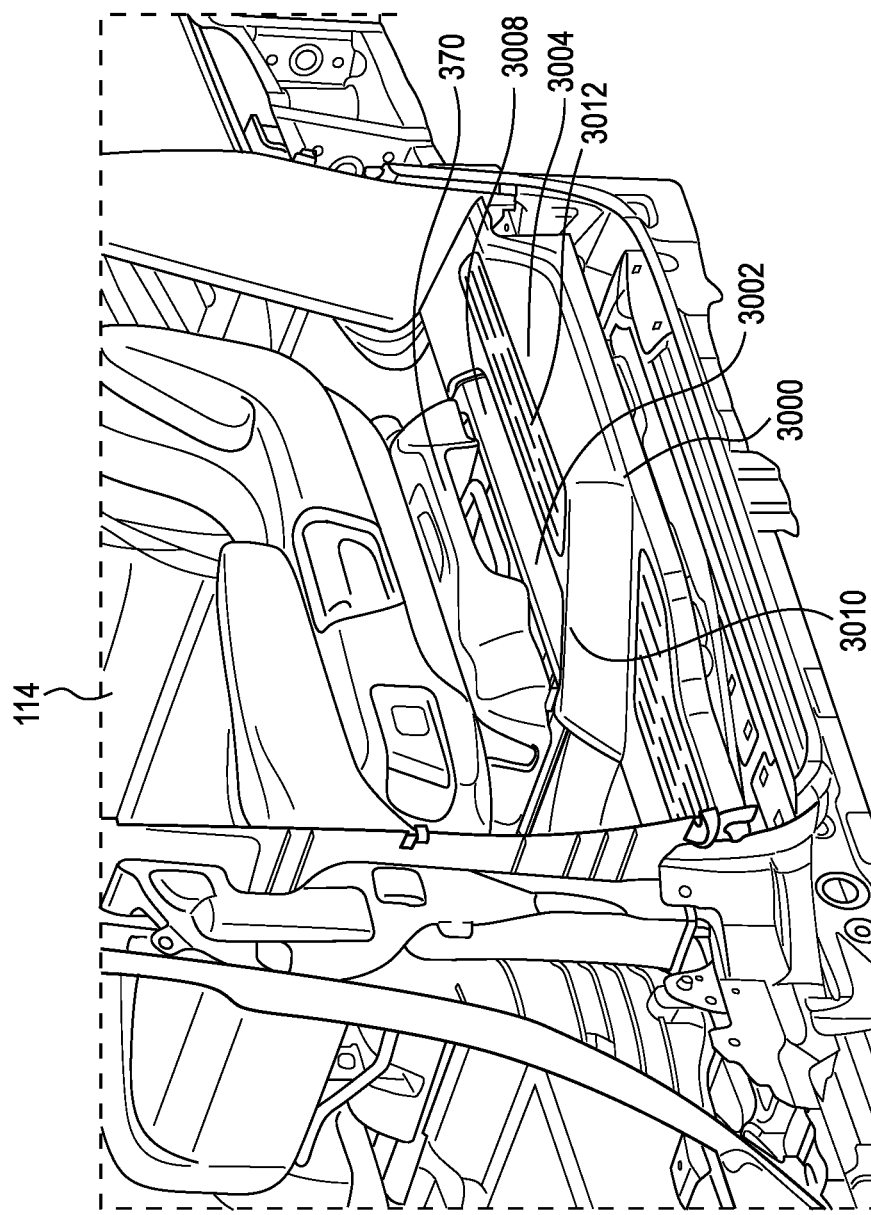
FIG. 30 is a perspective view of the side of an embodiment of the motor vehicle.
Figure 31:
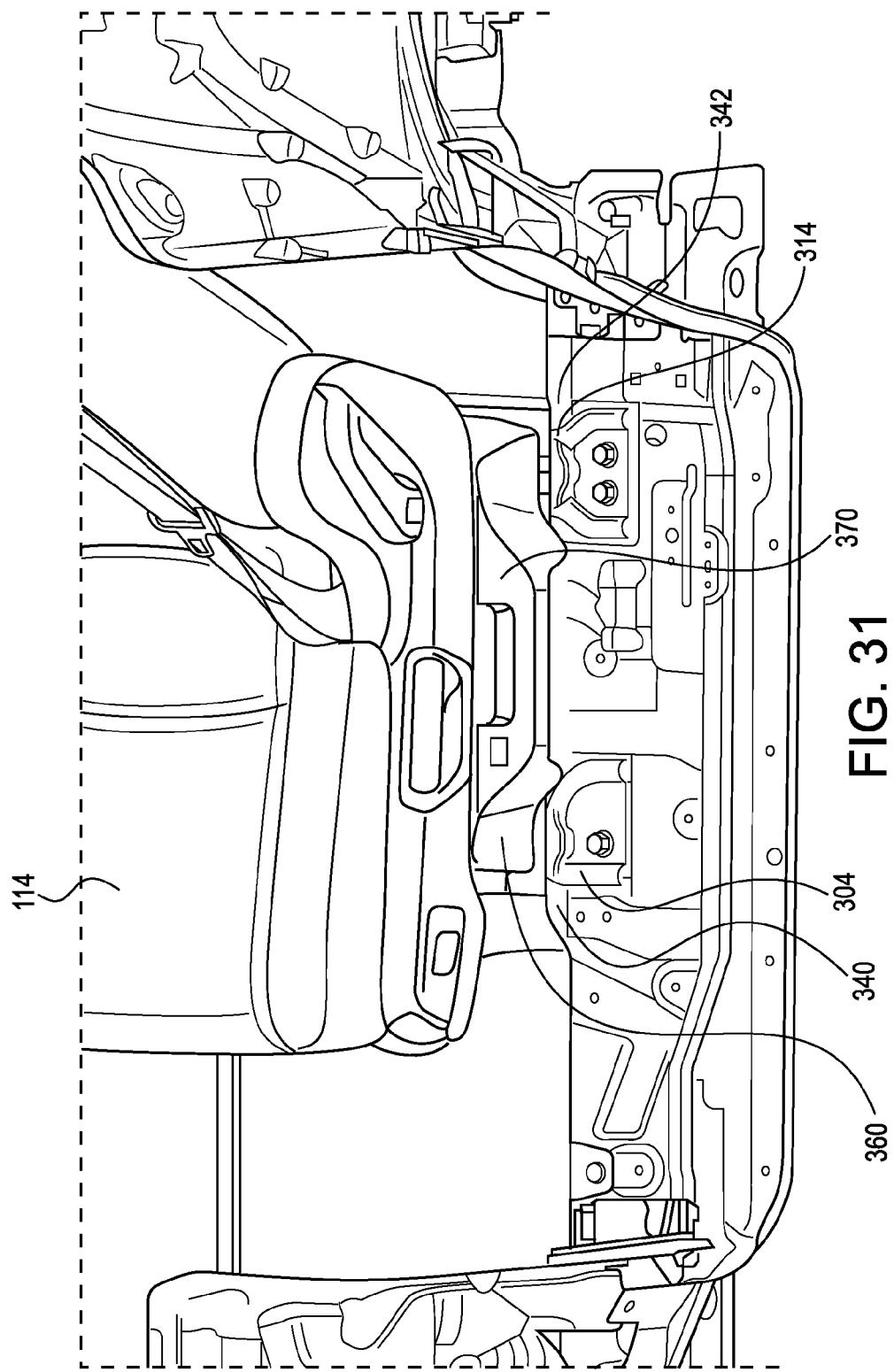
FIG. 31 is a top view of the embodiment of the side of a motor vehicle.
Figure 32:
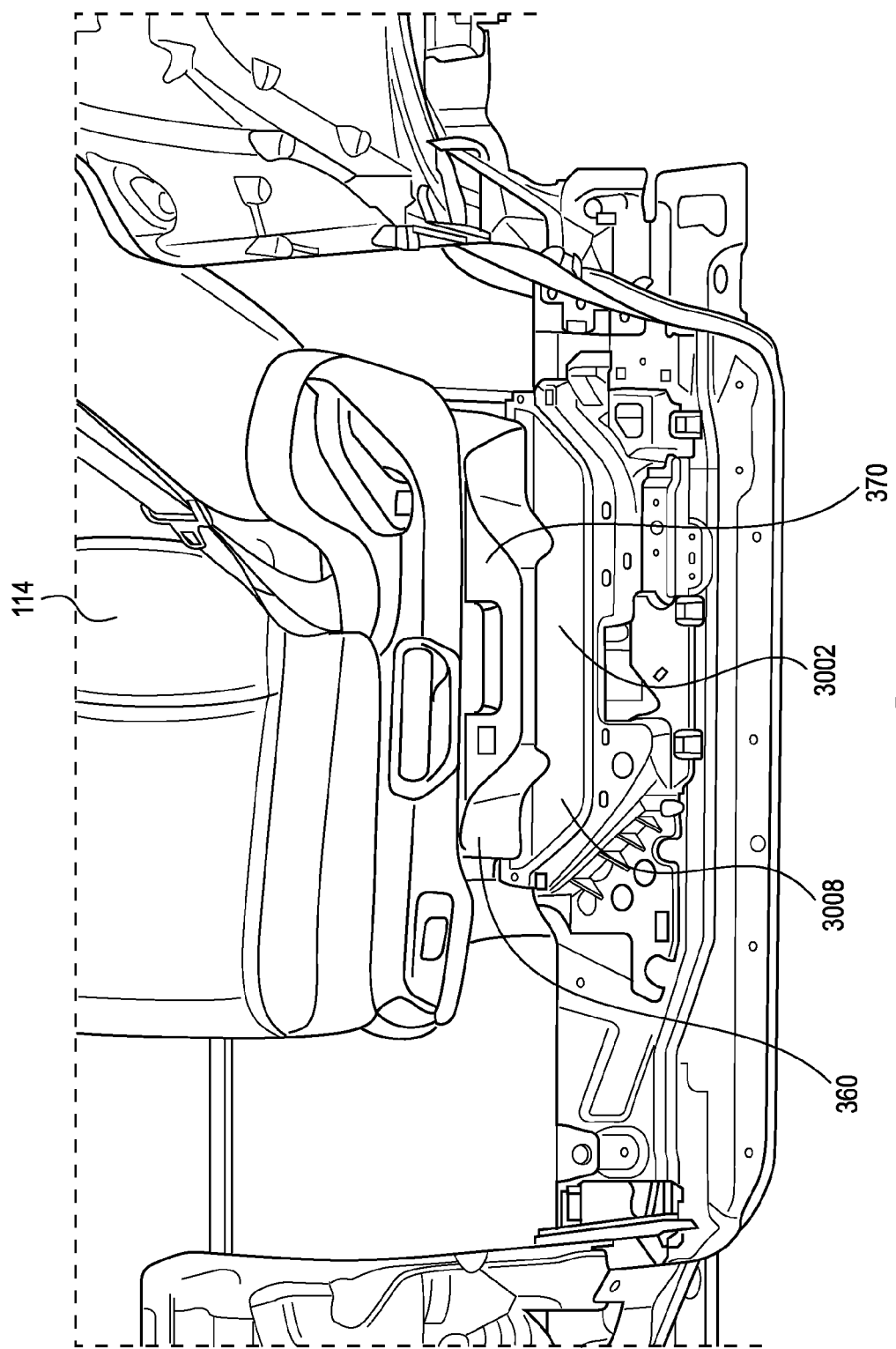
FIG. 32 is a top view of the embodiment of the side of a motor vehicle showing an embodiment of the side garnish.

As illustrated in FIGS. 27-29, the front and rear lower rails 304, 314 include a rail end bracket 2700 at each end 340, 342, 344, 346 of the rails 304, 314. The bracket has a generally U-shaped end 2704 that matches the U-shaped cross sectional profile of the ends 400, 402, 430, 432 of the lower rails 304, 314, with a center portion 2706 and two upper portions 2708, 2710. An L-shaped extension 2712 extends from the bottom 2714 of the center portion 2706. A first section 2716 of the L-shaped extension 2712 is attached to the bottom surface 2718 of the lower rail 304, 314. The attachment may be by any method known to one skilled in the art, including, but not limited to, a rivet 2900 as shown in FIG. 29, nut and bolt fastener, weld, and the like. The second section 2720 of the L-shaped extension 2712 extends upward from the first section 2716 of the L-shaped extension 2712. The second section 2720 may extend up to, but not higher than, the top 2722 of the lower rails 304, 314. The second section 2720 acts to block the sliding carriers 360, 362 at the lateral ends 340, 342, 344, 346 of the lower rails 304, 314. The U-shaped end 2704 of each rail end bracket 2700 acts as a cap at the end of the lower rails 304, 314 to prevent the introduction of dirt or debris into the substantially closed upper portions 406, 408, 436, 438 of the lower rails 304, 314 that would interfere with the free movement of the upper rails 306, 308, 316, 318 within the lower rails 304, 314.

Figure 33:
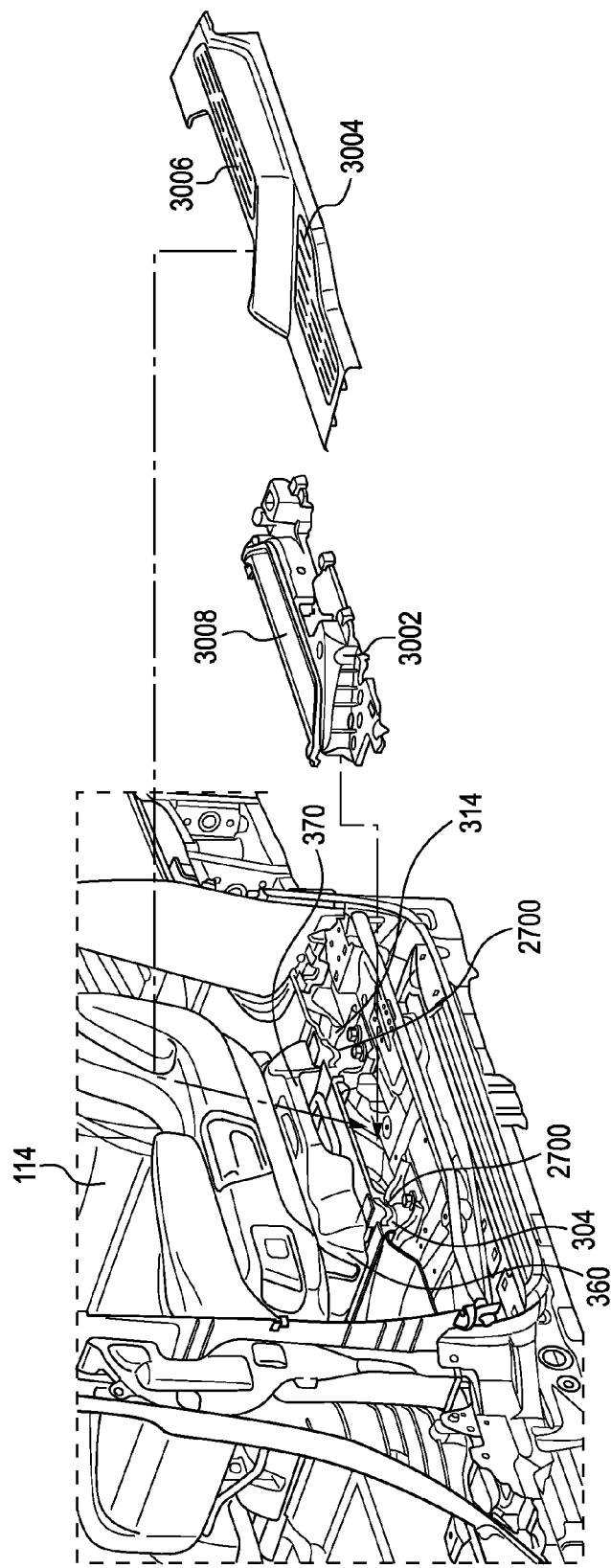
FIG. 33 is an exploded perspective view of an embodiment of a side garnish for a motor vehicle.

As illustrated in FIGS. 30-33, at the ends 340, 342, 344, 346 of the lower rails 304, 314 on either side 136, 138 of the motor vehicle 100 is located a step garnish 3000 that covers the ends 340, 342, 344, 346 of the lower rails 304, 314 and rail end brackets 2700. The step garnish 3000 is typically installed after the removable seats 114 are installed. In the past, the step garnish 3000 was installed by lowering the step garnish 3000 downwardly into place. However, the handles 370, 372 on the sliding carriers 360, 362 interfere with a downward installation. In order to solve this interference problem, the step garnish 3000 includes an inner step garnish 3002, which is installed from the side so that it fits underneath the handle 370, 372 of the sliding carriers 360, 362, as illustrated in FIG. 33. A second, outer step garnish 3004, which includes a cut out clearance shape 3006 for the handles 370, 372, is installed in the traditional manner. The exposed portion 3008 of the inner step garnish 3002 is designed to match the clearance shape 3006 of the outer step garnish 3004. When the outer step garnish 3004 is installed over the inner step garnish 3002, the exposed portion 3008 of the inner step garnish 3002 and the outer step garnish 3004 create a complete finished surface 3010 that is indistinguishable from a single piece step garnish. The finished surface 3010 may include ridges 3012 to create a greater friction surface to aid a user to enter or exit the motor vehicle 100. The step garnishes 3000 may be connected to the motor vehicle 100 using tappet screws, rivets, nuts and bolts, interference fit fasteners, or by any other method known to one skilled in the art.

Figure 34:
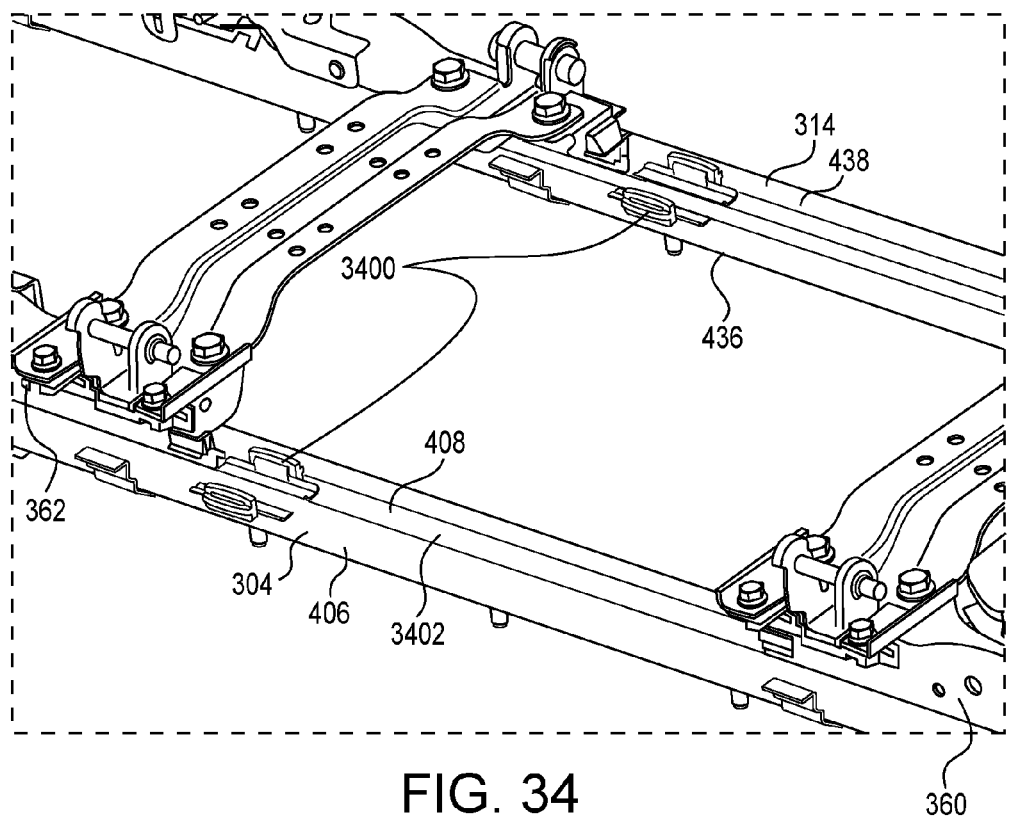
FIG. 34 is a perspective view of an embodiment of the slide rail system.
Figure 35:
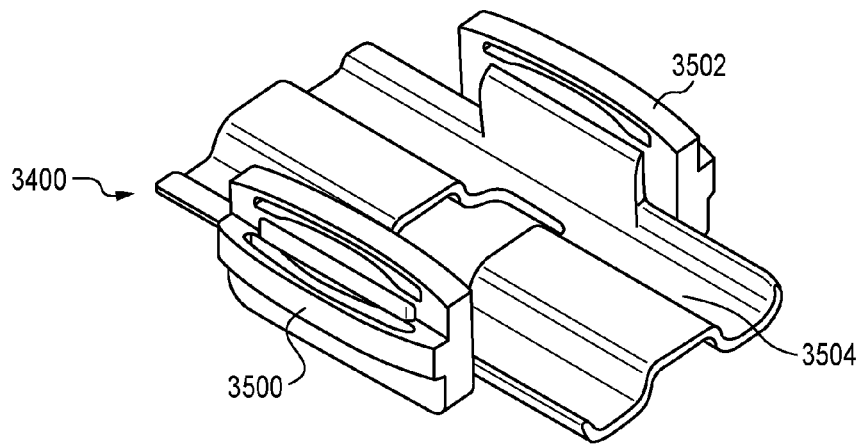
FIG. 35 is a perspective view of a spacer.

Further movement of the two sliding carriers 360, 362 may be controlled by inclusion of a spacer 3400 with one or both of the front or rear lower rails 304, 314. The spacer 3400 includes first and second plastic shoes 3500, 3502 that are located with the closed upper portions 406, 408, 436, 438 of the front and rear lower rails 304, 314. The plastic shoes 3500, 3502 are connected by a metal bracket 3504. The spacers 3400 are free to slide between the left and right sliding carriers 360, 362. The spacers 3400 prevent the two sliding carriers 360, 362 from coming into contact at a position along the sliding carriers 360, 362 overlapping slide range 3402. The spacers 3400 help maintain a safe distance between the removable seats 114 on the sliding carriers 360, 362. In the embodiment illustrated in FIGS. 34-35, the spacer 3400 maintains a safe 15 mm gap between the sliding carriers 360, 362 to prevent pinching between the seats 114. The plastic may be any formulation known to those skilled in the art to be durable and relatively low friction.

Figure 37:
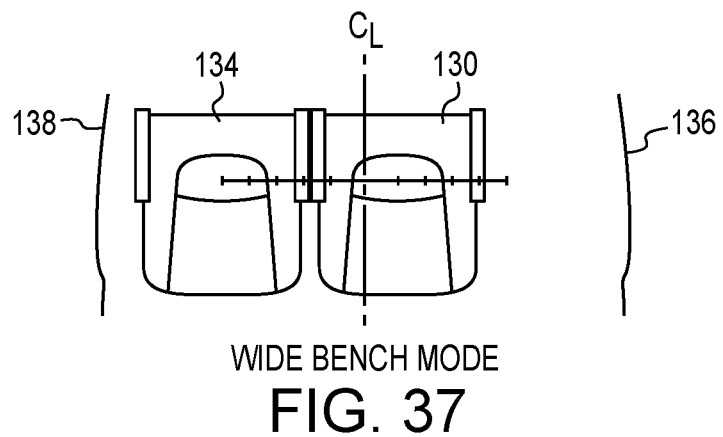
FIG. 37 is a top view of one embodiment of seat positions.
Figure 38:
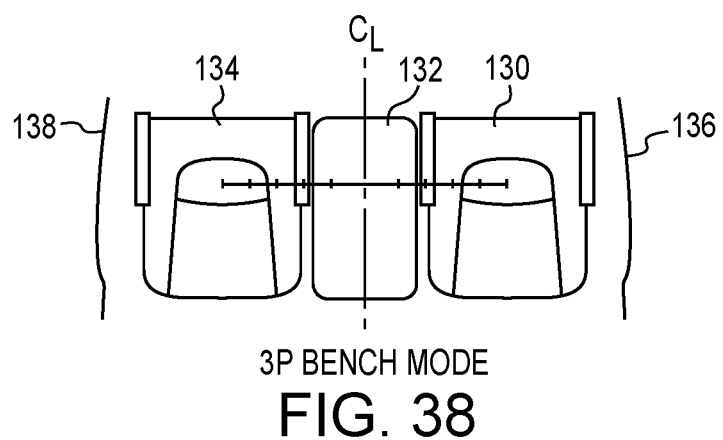
FIG. 38 is a top view of another embodiment of seat positions.
Figure 39:
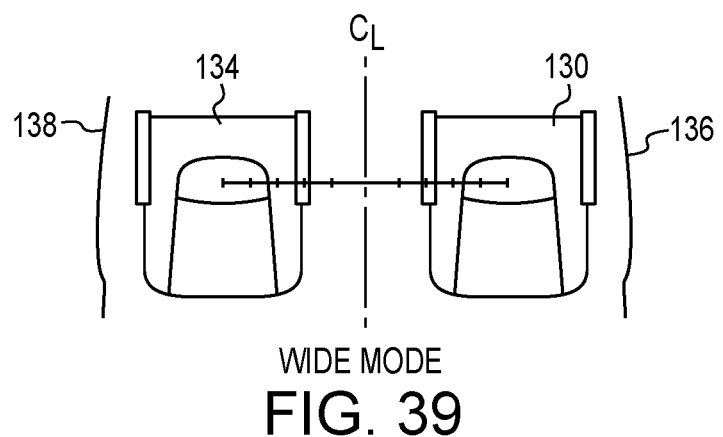
FIG. 39 is a top view of another embodiment of seat positions.
Figure 40:
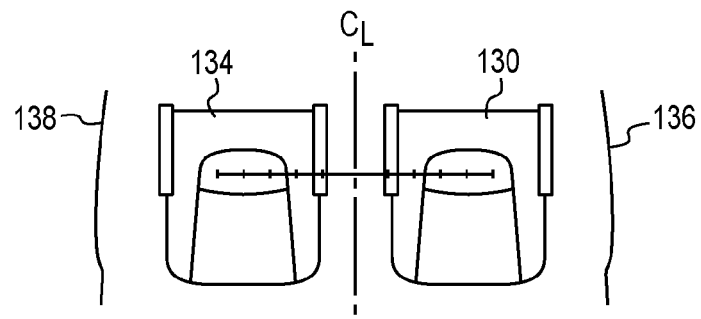
FIG. 40 is a top view of another embodiment of seat positions.
Figure 41:
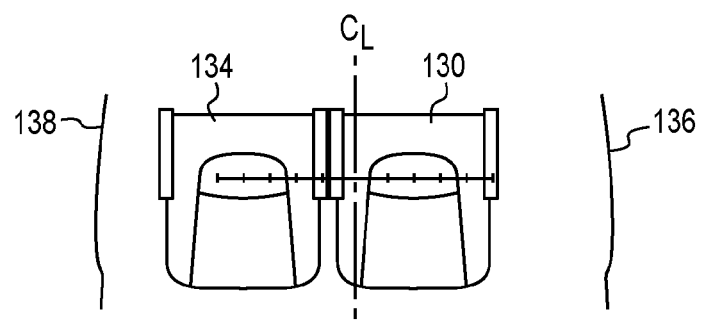
FIG. 41 is a top view of another embodiment of seat positions.
Figure 42:
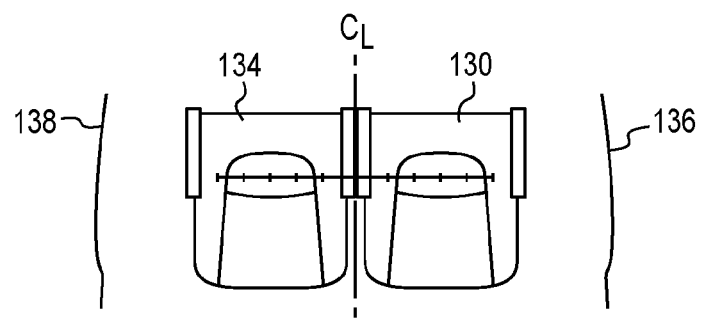
FIG. 42 is a top view of another embodiment of seat positions.

The left seat 130 on top of the left sliding carrier 360 and the right seat 134 on top of the right sliding carrier 362 may each slide between five (5) possible positions as illustrated by the table in FIG. 36. The five (5) possible positions correspond with the five (5) sets of three (3) holes 1300, 1302, 1304, 1306, 1308 located in the inner wall 1200 of the front lower rail 304 that are spaced to the right laterally from a longitudinal centerline CL of the motor vehicle 100 for use with the right sliding carrier 362, and the five (5) sets of three (3) holes (not shown) located in the inner wall 1200 of the front lower rail 304 that are spaced to the left laterally from the longitudinal centerline CL of the motor vehicle 100 for use with the left sliding carrier 360. On the table in FIG. 36, the position 445B corresponds to the first set of three (3) holes 1300. The position 363B corresponds to the second set of three (3) holes 1302. The position 281B corresponds to the third set of three (3) holes 1304. The position 199B corresponds to the fourth set of three (3) holes 1306. The position 117B corresponds to the fifth set of three (3) holes 1308. The positions −445B, −363B, −281B, −199B, and −117B correspond to the mirror image five (5) sets of three (3) holes on the left side 136 of the motor vehicle 100. The table in FIG. 36 represents the possible locations of the left seat 130 and right seat 134 for each of the positions. For example, if the left seat 130 is in position −117B, the only position for the right seat 134 is 445B, as shown in FIG. 37. FIGS. 37-42 show some possible seating positions for the embodiment of the motor vehicle 100 as described herein. FIG. 38 shows the left seat 130 in position −445B, while the right seat 134 is in position 445B. In this positioning, the center seat 132 is also installed. FIG. 39 shows the left seat 130 in position −445B, while the right seat 134 is in position 445B and the center seat 132 is removed. FIG. 40 shows the left seat 130 in position −363B, while the right seat 134 is in position 363B. This arrangement brings the two seats 130, 134 nearer together toward the centerline CL of the motor vehicle 100 and away for the left 136 and right 138 sides. FIG. 41 shows the left seat 130 in position −199B, while the right seat 134 is in position 363B. In this example, the two seats 130, 134 are still side-by-side, but the two seats are shifted laterally leftward compared to the example shown in FIG. 37 away from the right side 138 of the motor vehicle 100. FIG. 42 shows the left seat 130 in position −281B, while the right seat 134 is in position 281B. In this example, the two seats 130, 134 are side-by-side along the CL of the motor vehicle 100. The only restriction on how far the left sliding carriers 360 can slide across the lower rails 304, 314 is the position of the right carrier 362 and the spacers 3400 that separate the two. Additionally, the only restriction on how far the right sliding carriers 362 can slide across the lower rails 304, 314 is the position of the left carrier 360 and the spacers 3400 that separate the two.

As illustrated in FIGS. 37 and 41, the left sliding carrier 360 or the right sliding carrier (not illustrated) may cross the longitudinal centerline CL of the motor vehicle 100 if space is available.

Figure 4:
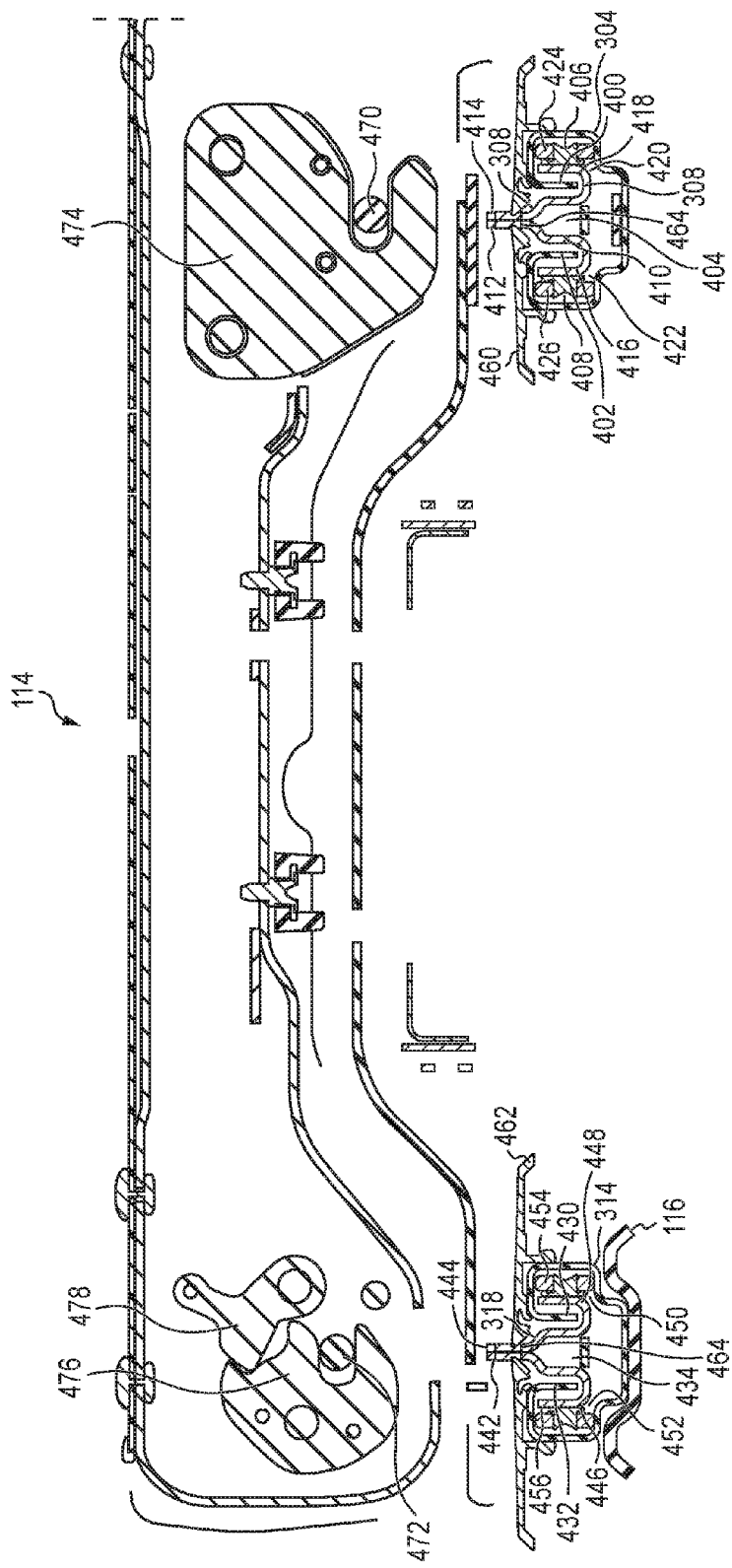
FIG. 4 is a cross-section along line G-G of FIG. 5.

Two removable seats 114, a left seat 130 and right seat 134, are designed to be secured to the sliding carriers 360, 362, the left seat 130 on left sliding carrier 360, and the right seat 134 on the right sliding carrier 362. As illustrated in FIG. 4, the seats 130, 134 are connected to the sliding carriers 360, 362 via hook fasteners 474 around the front strikers 470 and hook and lock fasteners 476 that hook around the rear strikers 472 located on the cross brackets 350, 352, 354, 356 and exposed through the openings 510 in the covers 500, 502 of the sliding carriers 360, 362. The hook fasteners 474 and the hook and lock fasteners 476 are of a type known to those skilled in the art.

Figure 43:
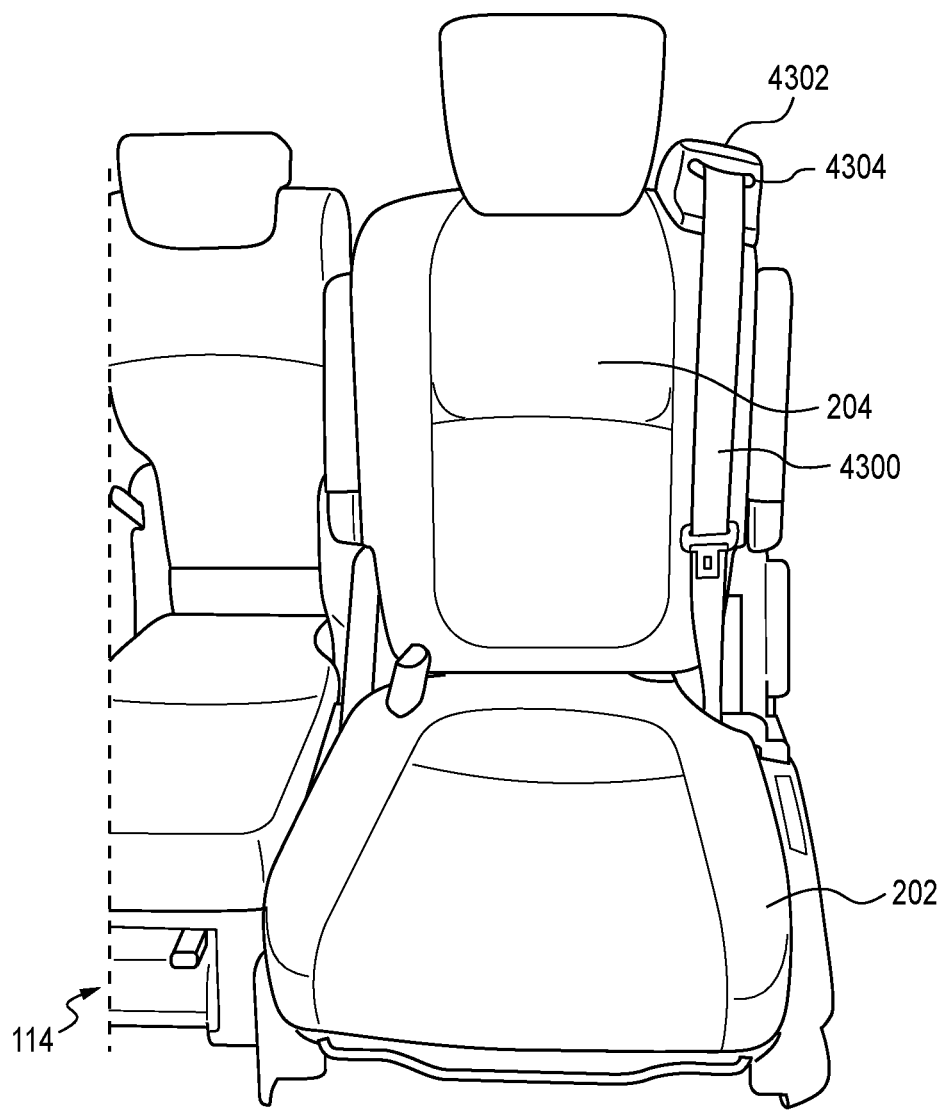
FIG. 43 front view of an embodiment of a seat.
Figure 44:
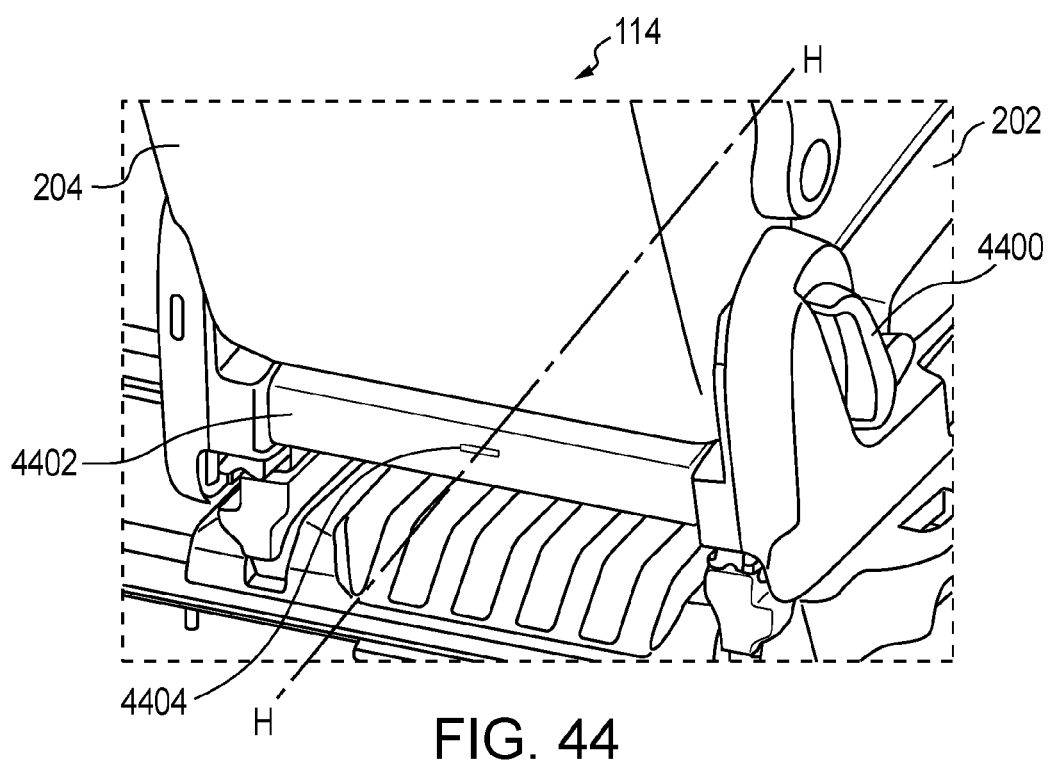
FIG. 44 is a perspective view of an embodiment of a lateral slide removable seat.
Figure 45:
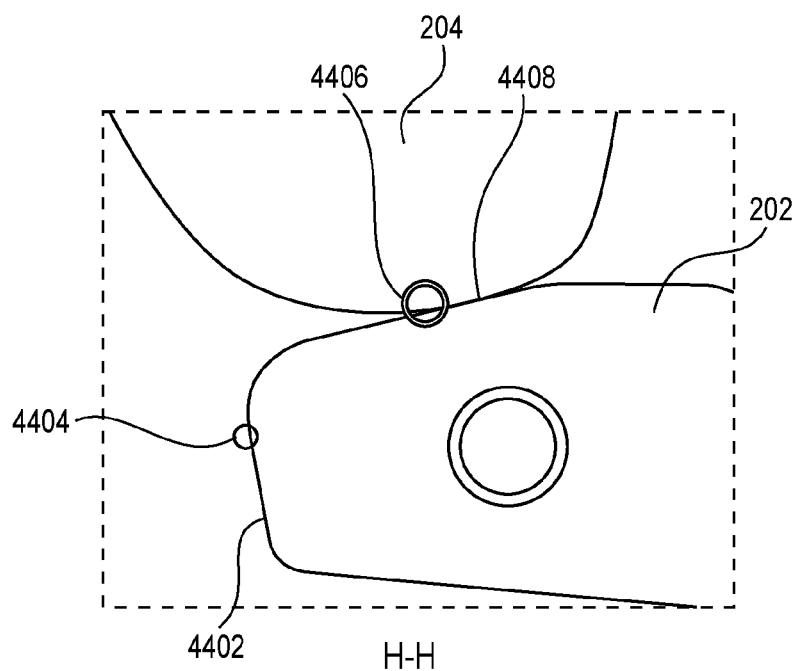
FIG. 45 is cross-section along line H-H of FIG. 44.
Figure 46:
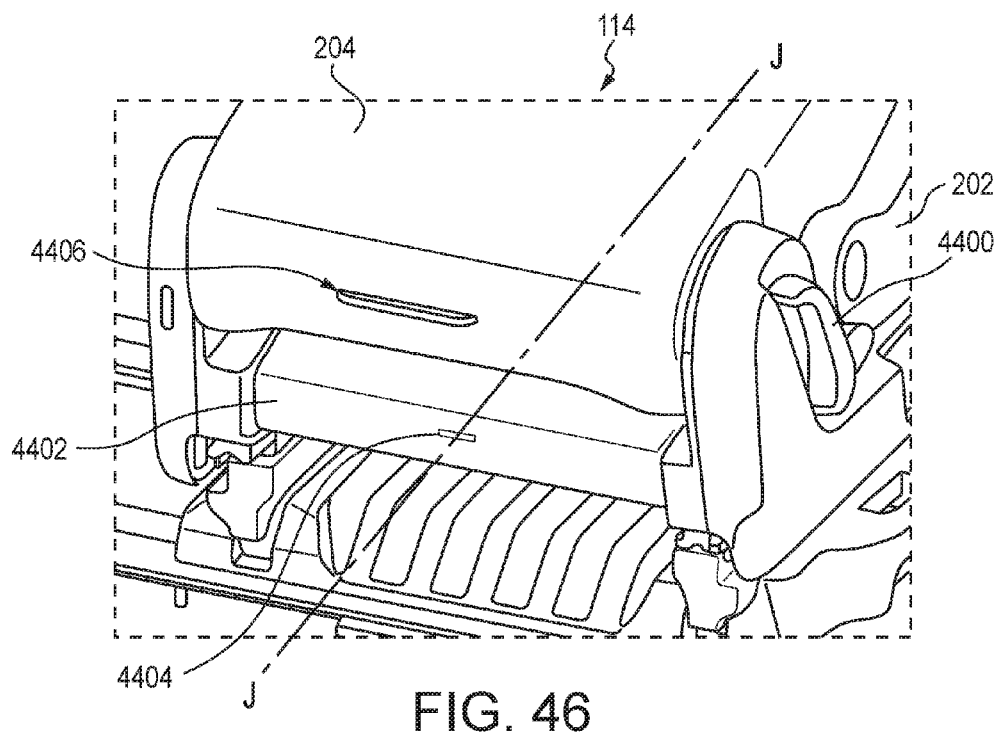
FIG. 46 is a perspective view of an embodiment of a lateral slide removable seat in a folded position.
Figure 47:
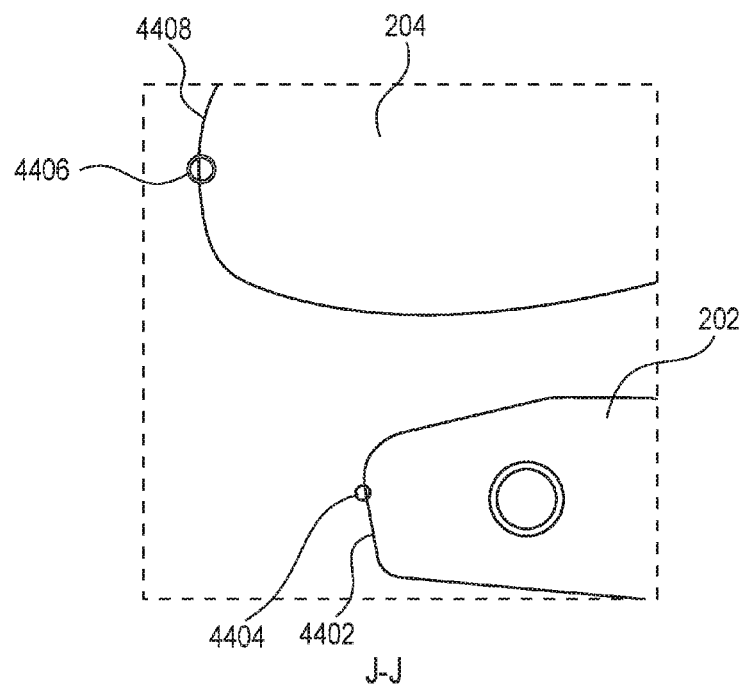
FIG. 47 is a cross-section along line J-J of FIG. 46.

As illustrated in FIGS. 43-47, during typical operation of the removable seats 114, the removable seat 114 is moved from an upright position, illustrated in FIGS. 43-45, to a folded position, illustrated in FIGS. 46-47, by actuation of a first lever 4400 on the seat 114. Located at the back 4402 of the seat cushion 202 below the seat back 204 is a LATCH striker 4404 used for the LATCH car seat system that is standard in automobiles. When the seat back 204 is folded down upon actuation of the first lever 4400, a seat handle 4406 is exposed that is on the bottom 4408 of the seat back 204 when the seat back 204 is upright. By hiding the seat handle 4406 when the seat 114 is in the upright position, improper attachment of a LATCH enable car seat may be avoided by only having the LATCH striker 4404 visible.

Figure 48:
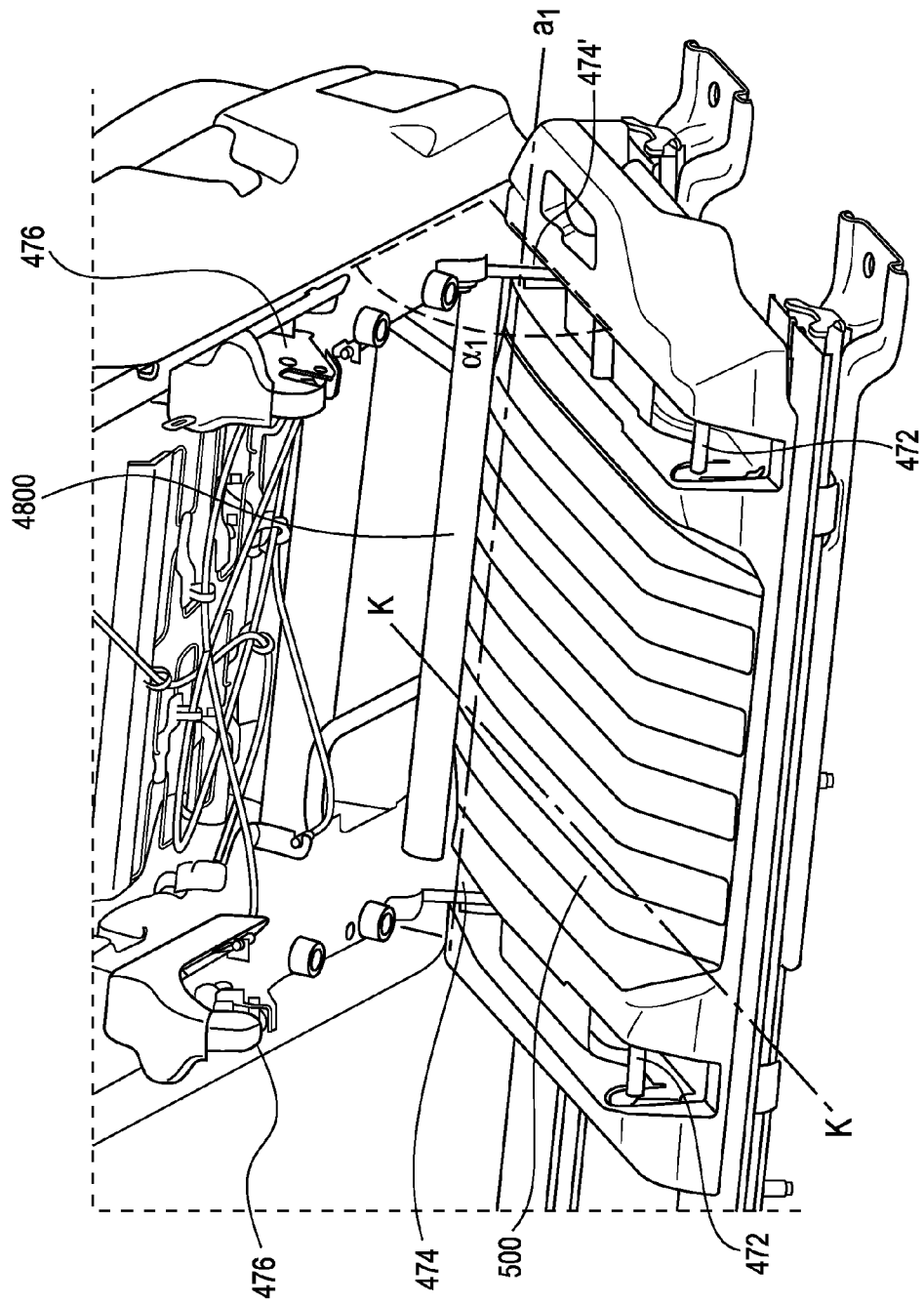
FIG. 48 is a rear perspective view of an embodiment of a lateral slide removable seat in a folded and rotated position.
Figure 49:
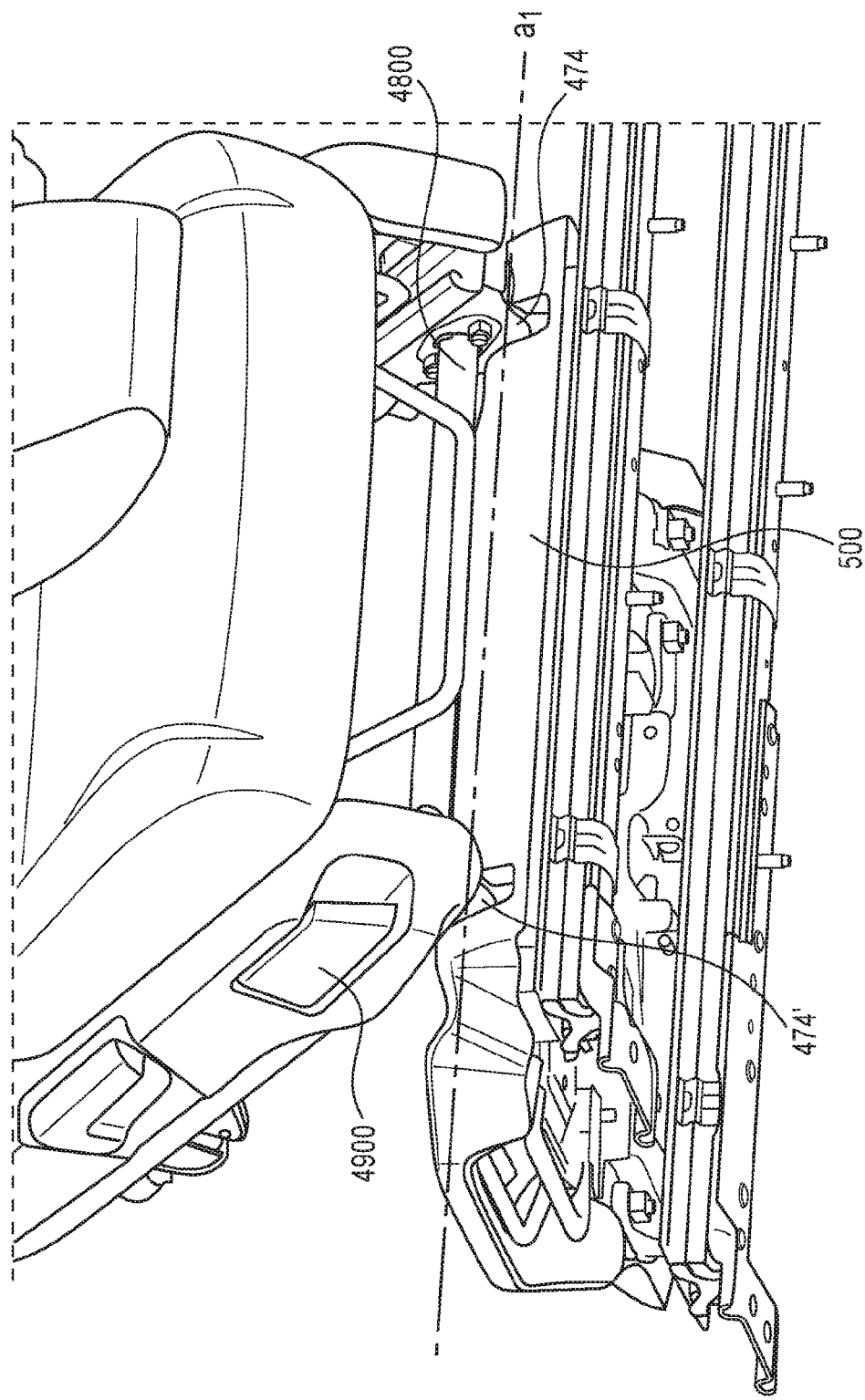
FIG. 49 is a front perspective view of the embodiment of a lateral slide removable seat in a folded and rotated position.
Figure 50:
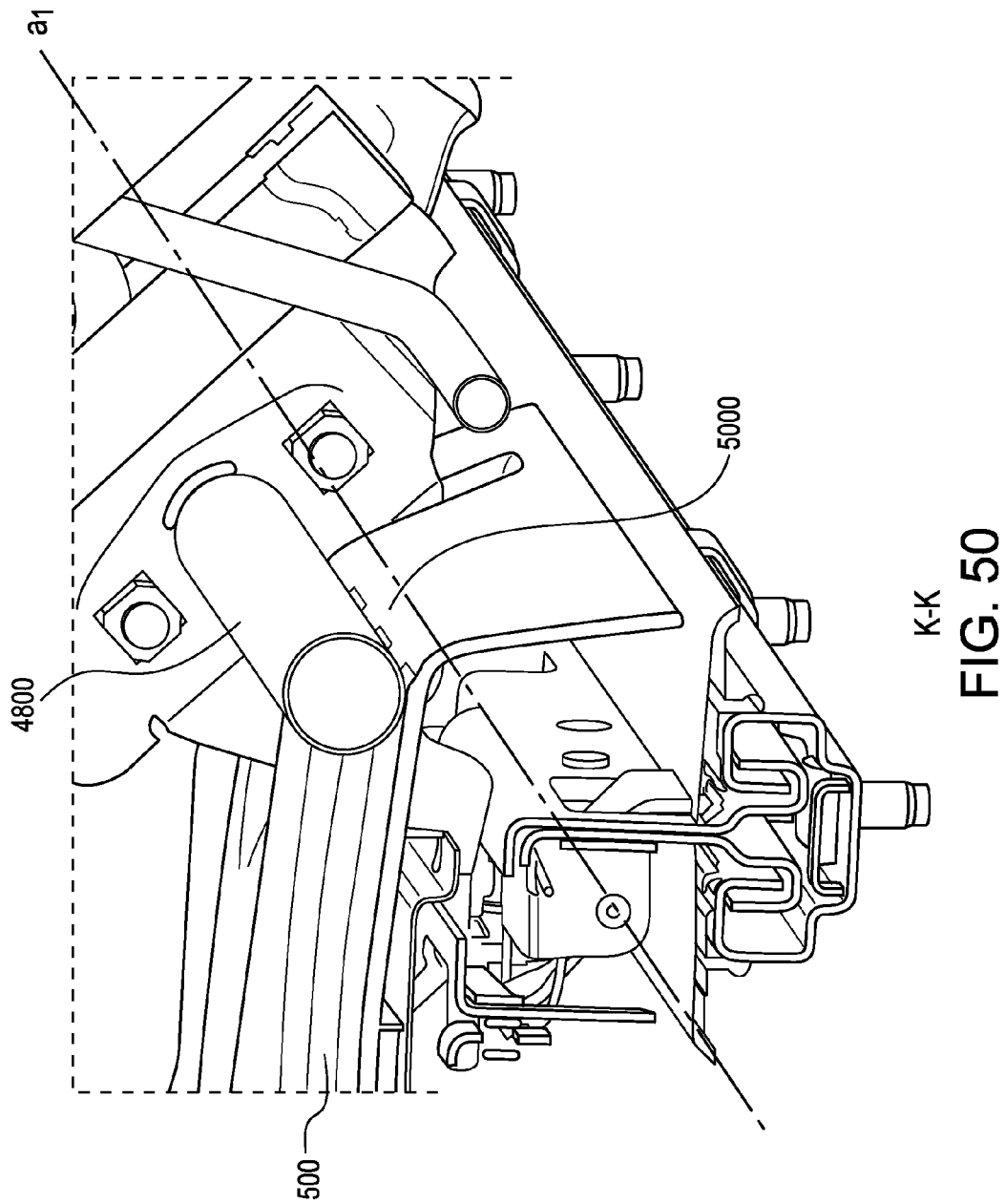
FIG. 50 is a cross section along line K-K of FIG. 48.
Figure 51:
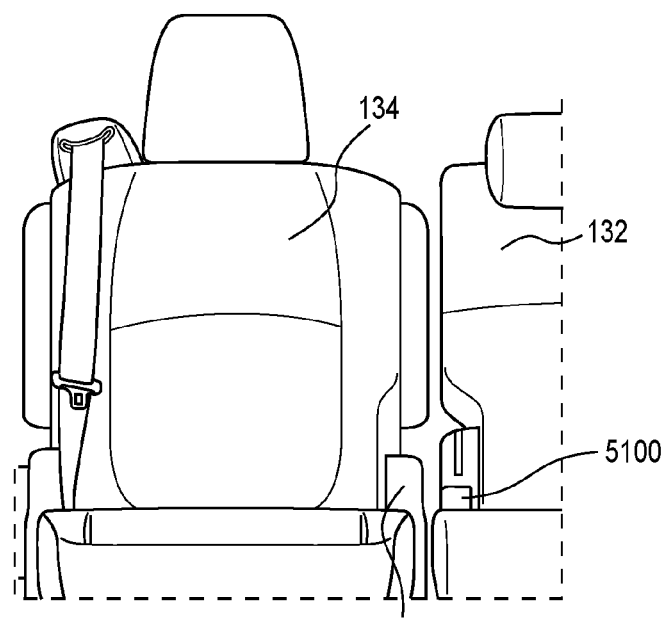
FIG. 51 is a front view of an embodiment of a front and center removable seat.
Figure 52:
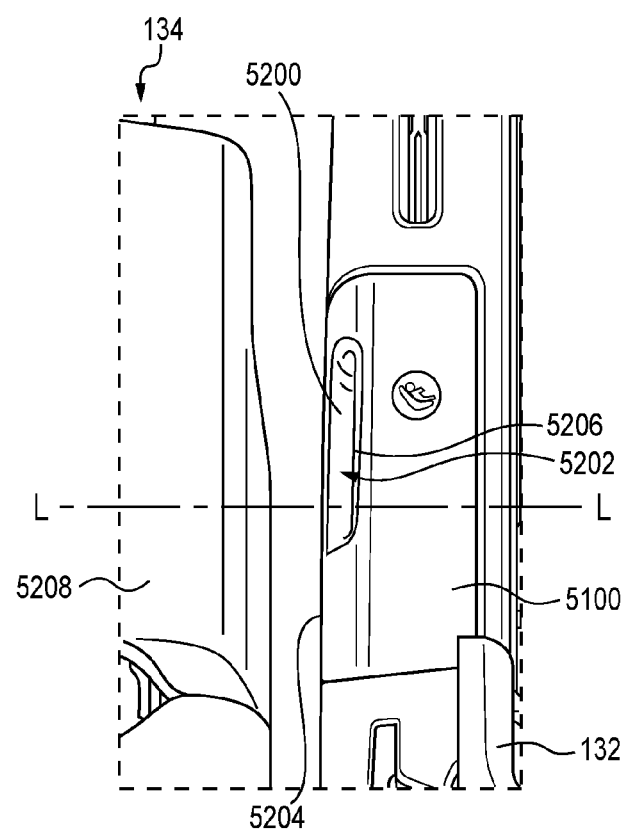
FIG. 52 is a close up of a portion of FIG. 51.

As illustrated in FIGS. 48-50, in order to remove the seat 114, a lock 478 is released on the rear hook and lock fasters 476 by actuating a second lever 4900 in the seat 114. When the lock 478 is released, the user may grasp the seat handle 4406 and lift the rear 4402 of the seat 114. Lifting the rear 4402 of the seat 114 from the rear strikers 472 allows the seat 114 to be rotated about and axis $a_1$ that runs through the front strikers 470. When the seat 114 reaches an appropriate angle $\alpha_1$, the front hooks 474 may be removed from the front strikers 470, and the seat 114 is removed.

A bar 4800 extends from the left front hook fastener 474 to the right front hook fastener 474' parallel to and around the axis $a_1$ through the strikers 470. As the user rotates the seat 114 forward to remove the front hook fasteners 474, 474', the bar 4800 rotates forward and down as it rotates about axis $a_1$ until it contacts the cover 500. The shape of the forward portion 5000 of the cover 500 is designed so that the bar 4800 contacts the front portion 5000 of the cover 500 when the seat 114 has been rotated an angle $\alpha_1$ about the axis $a_1$. In the embodiment illustrated, angle $\alpha_1$ is approximately 45°, although the angle $\alpha 1$ may be tuned based upon the geometry and available space of the motor vehicle 100. Once the bar 4800 contacts the cover 500, the user is prevented from rotating the seat 114 any further. This operation controls the location of the seat when the user is removing the seat to be in an optimum position. This also prevents the seat 114 from contacting any other interior components by rotating too far forward.

Figure 53:
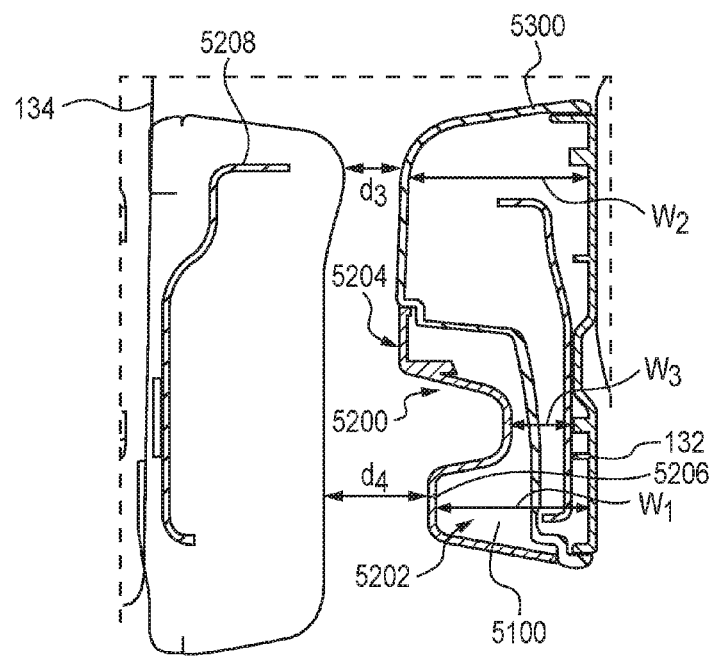
FIG. 53 is a cross-section along line L-L of FIG. 52.
Figure 54:
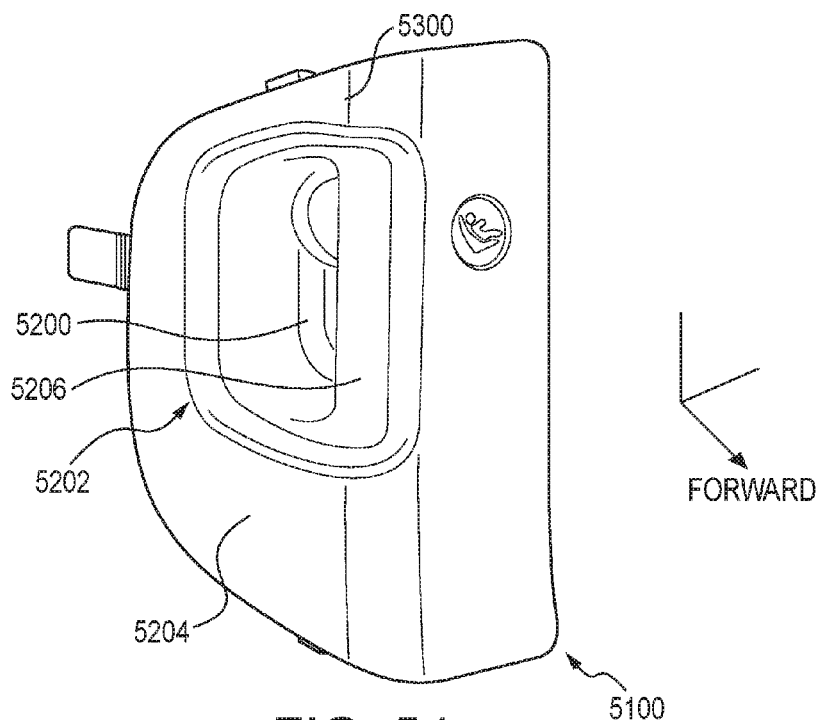
FIG. 54 is a perspective view of an embodiment of an ISOFIX cap.
Figure 55:
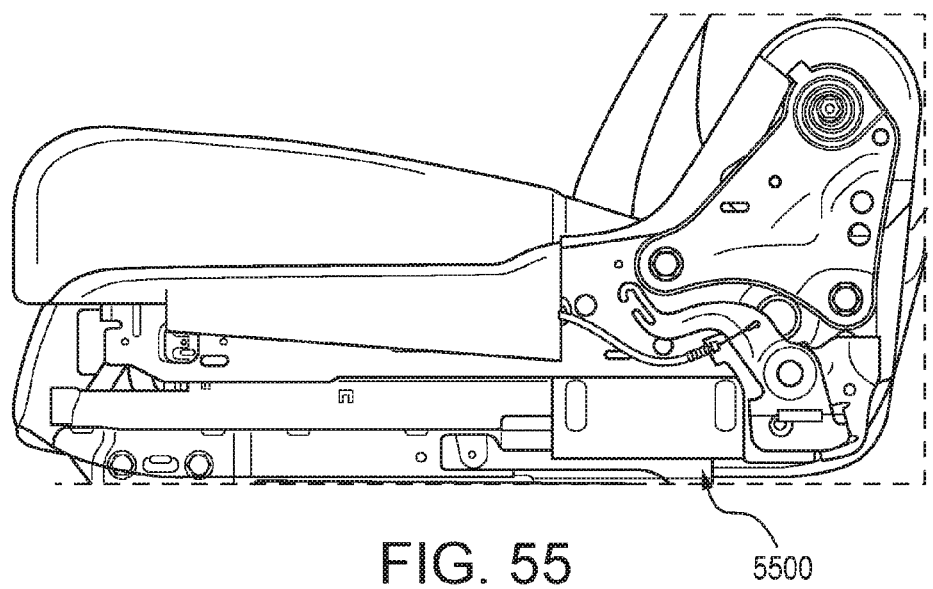
FIG. 55 is a side view of a portion of a removable seat.
Figure 56:
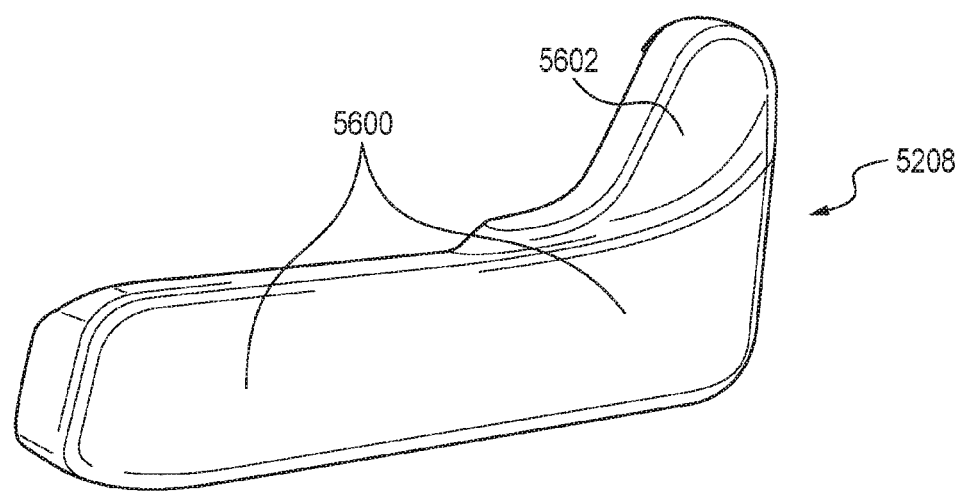
FIG. 56 is a perspective view of an embodiment of an inner cover of a removable seat.
Figure 57:
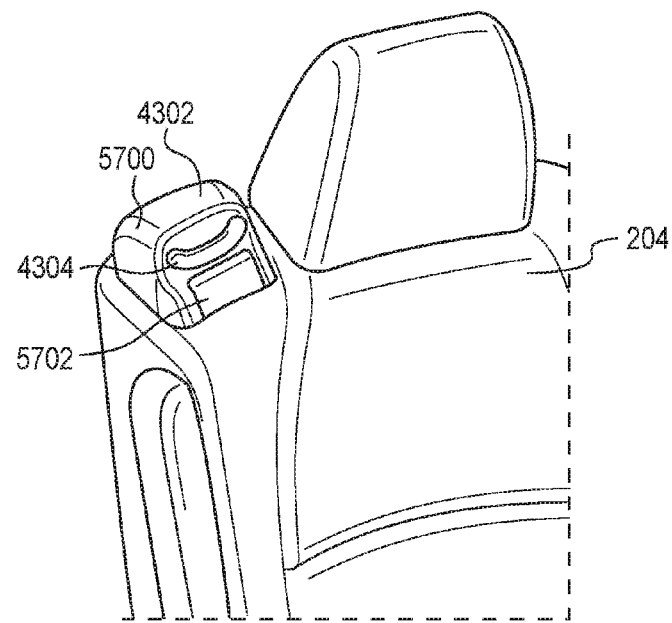
FIG. 57 is a perspective view of a portion of a seat illustrated in FIG. 43.
Figure 58:
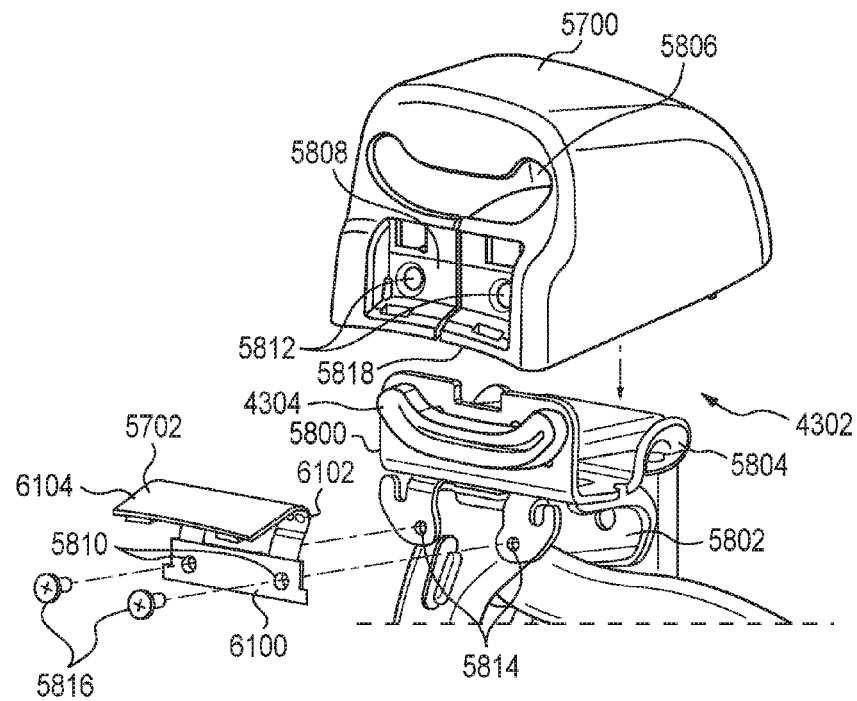
FIG. 58 is an exploded view of a garnish and seatbelt mechanism for a removable seat.
Figure 59:
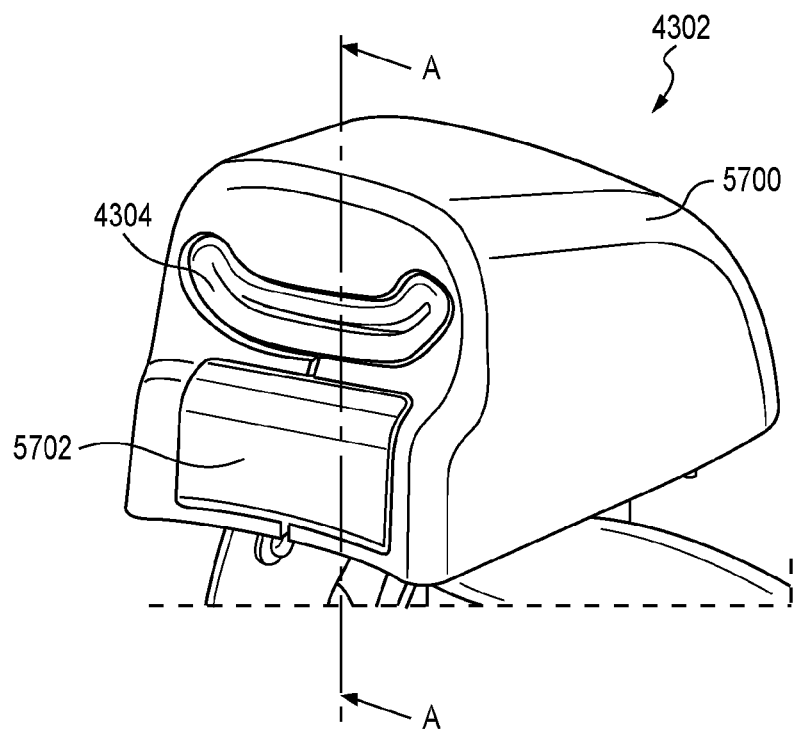
FIG. 59 is a rear view of a garnish and seatbelt mechanism for a removable seat.

As illustrated in FIGS. 51-54, when the center seat 132 is in the upright position, the center seat 132 includes a left ISOFIX bar (not shown), which is located beneath a cap 5100 and a right ISOFIX bar (not illustrated) for use with a LATCH-enabled child seat. The seat 132 includes a cap 5100 that covers each bar when the LATCH system is not in use to prevent users from accidentally getting straps or the like hooked on the ISOFIX bars. When the left removable seat 130 or the right removable seat 134 is positioned up against the center seat 132, removing the cap 5100 to expose the ISOFIX bar can be problematic. In order to make removal of the cap 5100 easier for a user, the cap 5100 includes a scoop portion 5200 on the grip portion 5202 of the cap 5100. The grip portion 5202 not only includes a scoop portion 5200 in the side 5204 of the cap 5100, but also an indented portion 5206 longitudinally forward of the scoop out shape 5200 to further increase access by a user's hand. As illustrated in FIG. 53, the indented portion 5206 longitudinally forward of the scoop portion 5200 has a lateral width $w_1$ less than a lateral width $w_2$ of the cap body 5300 and greater than a lateral width $w_3$ of the scoop portion 5200.

In addition to the cap 5100 on the ISOFIX bar on the center seat 132, the laterally L-shaped inner cover 5208 of the seat frame 5500 of the left and right seats 130, 134 has a smooth lower external surface 5600 and a smooth and recessed external upper surface 5602 that is laterally opposite the ISOFIX cap 5100 of the center seat 132 that provides additional clearance for a user to access the grip portion 5202 of the cap 5100. As illustrated in the embodiment shown in FIGS. 51-56, the minimum gap $d_3$ between the center seat 132 and left seat 130 or right seat 134 is 16 mm, but the recessed external upper surface 5602 of the inner cover 5208 of the seat frame 5500 of the left seat 130 or right seat 134, and the scoop portion 5200 of the cap 5100 over the ISOFIX bar, at the location of the indention portion 5206 longitudinally forward of the scoop portion 5200 provides a clearance $d_4$ of 30 mm for the user to grip and remove the ISOFIX cap 5100.

Figure 60:
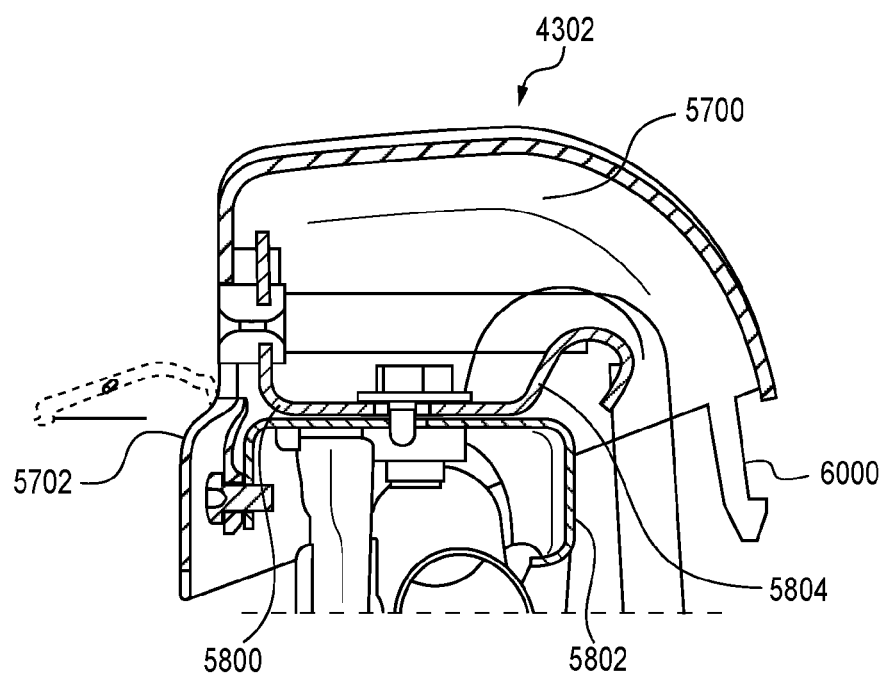
FIG. 60 is a cross section along line M-M of FIG. 59.
Figure 61:
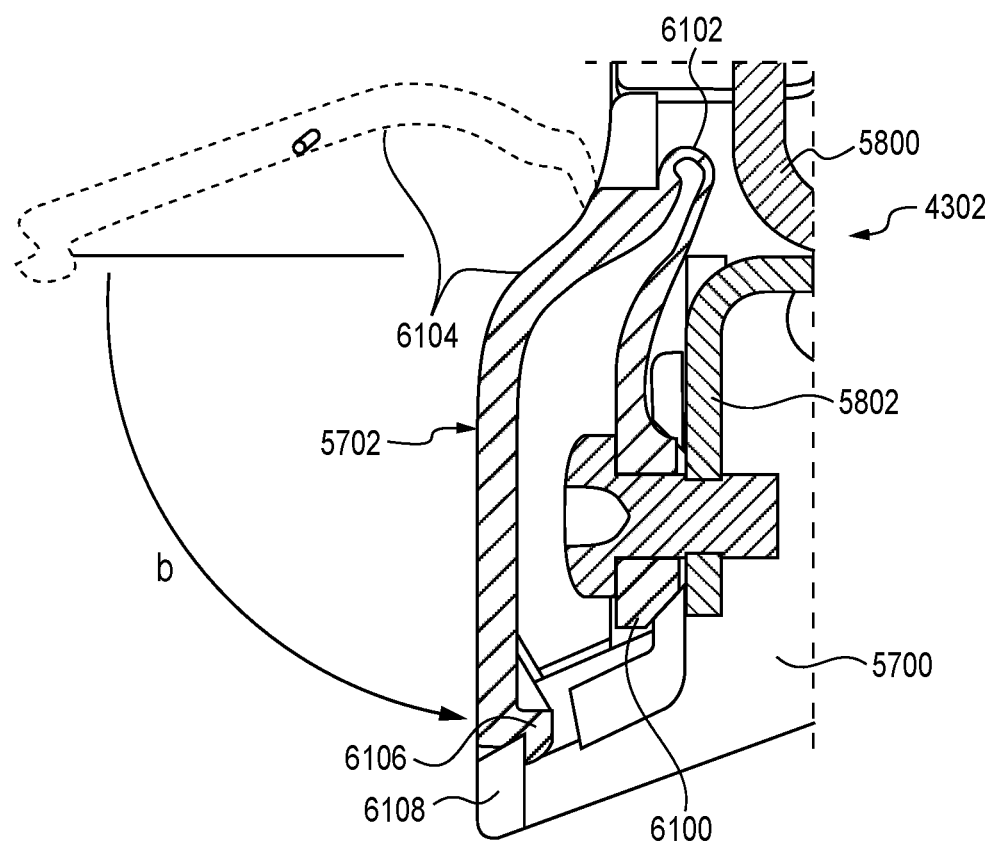
FIG. 61 is a close up of a portion of FIG. 60.

Another feature of the removable seats 114 is the necessity of providing a seatbelt 4300 for the user as illustrated in FIGS. 43 and 57-61. Because the removable seats 114 are slidable between five separate positions as previously described, the seatbelt 4300 is integrally provided within the removable 114 by methods known to those skilled in the art. However, at the top of the seat back 204, a seatbelt mechanism 4302 is provided for protecting the seatbelt 4300 and to transition the seatbelt 4300 from within the seat 114 to the outside of the seat 114, as illustrated in FIG. 60. The seatbelt mechanism 4302 includes an arcuate slot 4304 through which the seatbelt 4300 extends and is presented to the user for use. The arcuate slot 4304 includes an extended base 5800 that sits on top of and is connected to a bracket 5802. The extended base 5800 also includes a raised and curved section 5804 over which the seatbelt 4300 moves and transitions from a vertical orientation to a horizontal orientation. The seatbelt mechanism 4302 also includes a garnish 5700 that protects the seatbelt 4300 during use and when the seat 114 is removed. The arcuate slot 4304 is designed to prevent the seatbelt 4300 from reversing the side presented to the user and becoming twisted or tangled.

Due to position of the garnish 5700, there is a need for a method and apparatus to attach the garnish 5700 to the seatbelt mechanism 4302 that is both easy to install and durable during use of the seat 114 in the intended manner. As shown in FIGS. 57-61, the garnish 5700 primarily is constructed of a solid molded plastic piece that includes an arcuate opening 5806, a cap opening 5808, and an interference fit fastener 6000 that extends from the bottom of the garnish 5700. The interference fit fastener 6000 is inserted into a slot (not shown) in the seatbelt mechanism 4302. The arcuate slot 4304 fits into the arcuate opening 5806 of the garnish 5700.

A cap 5702 is provided for completing attachment of the garnish 5700 to the seatbelt mechanism 4302. The cap 5702 is constructed of a single piece that includes a base portion 6100, a living hinge 6102, and an outer cover 6104. The base portion includes, in the embodiment shown in the FIGS. 58-61, includes two holes 5810 that correspond to two holes 5812 in the cap opening 5808 of the garnish 5700 and two holes 5814 in the bracket 5802. Tapping screws 5816 are used to connect the base portion 6100 of the cap 5702 and garnish 5700 to the bracket 5802. The outer cover 6104 of the cap 5702 is then folded over downwardly at the living hinge 6102, as shown by arrow b in FIG. 61, and the outer cover 6104, now folded over and parallel with the base portion 6100, covers the base portion 6100. The outer cover 6104 has a tapered end 6106 that snaps into a hook surface 6108 of the lower edge 5818 of the cap opening 5808 of the garnish 5700. The tapered end 6106 creates an interference fit with the hook surface 6108 to hold the cover 5702 in place.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A rail and carrier system for first and second removable seats for a motor vehicle, comprising:
    a first lower rail fixedly attached to and positioned laterally along a floor of the motor vehicle;
    a first upper rail nested with and laterally slidable within the first lower rail;
    a second upper rail nested with and laterally slidable within the first lower rail;
    a second lower rail positioned laterally along the floor of the motor vehicle parallel to the first lower rail and longitudinally rearward of the first lower rail;
    a third upper rail nested with and laterally slidable within the second lower rail;
    a fourth upper rail nested with and laterally slidable within the second lower rail;
    first and second cross brackets laterally spaced apart and arranged perpendicular to the first and third upper rails, the first and second cross brackets being connected to the first and third upper rails;
    third and fourth cross brackets laterally spaced apart arranged perpendicular to the second and fourth upper rails, the third and fourth cross brackets being connected to the second and fourth upper rails;
    a first cover connected to and extending between the first and second cross brackets; and
    a second cover connected to and extending between the third and fourth cross brackets.

2. The rail and carrier system of claim 1 wherein:
    each of the first, second, third, and fourth upper rails each have a first end and a second end laterally opposite the first end;
    the first cross bracket is connected to the first end of the first upper rail and the first end of the third upper rail;
    the second cross bracket is connected to the second end of the first upper rail and the second end of the third upper rail;
    the third cross bracket is connected to the first end of the second upper rail and the first end of the fourth upper rail; and
    the fourth cross bracket is connected to the second end of the second upper rail and the second end of the fourth upper rail.

3. The rail and carrier system of claim 2 wherein:
    a portion of the first upper rail is always positioned on a first side of a longitudinal centerline of the motor vehicle;
    a portion of the third upper rail is always positioned on the first side of the longitudinal centerline of the motor vehicle;
    a portion of the second upper rail is always positioned on a second side of the longitudinal centerline of the motor vehicle; and
    a portion of the fourth upper rail is always positioned on the second side of the longitudinal centerline of the motor vehicle.

4. The rail and carrier system of claim 3 further comprising:
    a first front striker attached to a top of a longitudinally forward portion of the first cross bracket;
    a second front striker attached to a top of a longitudinally forward portion of the second cross bracket;
    a first rear striker attached to a top of a longitudinally rearward portion of the first cross bracket;
    a second rear striker attached to a top of a longitudinally rearward portion of the second cross bracket; and
    wherein the first and second front strikers and first and second rear strikers extend upward through openings in the first cover.

5. The rail and carrier system of claim 4 further comprising:
    a third front striker attached to a top of a longitudinally forward portion of the third cross bracket;
    a fourth front striker attached to a top of a longitudinally forward portion of the fourth cross bracket;
    a third rear striker attached to a top of a longitudinally rearward portion of the third cross bracket; and
    a fourth rear striker attached to a top of a longitudinally rearward portion of the fourth cross bracket; and
    wherein the third and fourth front strikers and third and fourth rear strikers extend upward through openings in the second cover.

6. The rail and carrier system of claim 5 wherein the first removable seat is attached to the first and second front strikers and the first and second rear strikers.

7. The rail and carrier system of claim 6 wherein the second removable seat is attached to the third and fourth front strikers and the third and fourth rear strikers.

8. A rail and carrier system for first and second removable seats for a motor vehicle, comprising:
    a first lower rail fixedly attached to and positioned laterally along a floor of the motor vehicle;
    a first upper rail nested with and laterally slidable within the first lower rail;
    a second upper rail nested with and laterally slidable within the first lower rail;
    a second lower rail positioned laterally along the floor of the motor vehicle parallel to the first lower rail and longitudinally rearward of the first lower rail;
    a third upper rail nested with and laterally slidable within the second lower rail;
    a fourth upper rail nested with and laterally slidable within the second lower rail;
    first and second cross brackets laterally spaced apart and arranged perpendicular to the first and third upper rails, the first and second cross brackets being connected to the first and third upper rails;
    third and fourth cross brackets laterally spaced apart arranged perpendicular to the second and fourth upper rails, the third and fourth cross brackets being connected to the second and fourth upper rails;
    a first front striker attached to a top of a longitudinally forward portion of the first cross bracket;
    a second front striker attached to a top of a longitudinally forward portion of the second cross bracket;
    a first rear striker attached to a top of a longitudinally rearward portion of the first cross bracket;
    a second rear striker attached to a top of a longitudinally rearward portion of the second cross bracket;

a third front striker attached to a top of a longitudinally forward portion of the third cross bracket;

a fourth front striker attached to a top of a longitudinally forward portion of the fourth cross bracket;

a third rear striker attached to a top of a longitudinally rearward portion of the third cross bracket; and a fourth rear striker attached to a top of a longitudinally rearward portion of the fourth cross bracket.

9. The rail and carrier system of claim 8 wherein:

each of the first, second, third, and fourth upper rails each have a first end and a second end laterally opposite the first end;

the first cross bracket is connected to the first end of the first upper rail and the first end of the third upper rail;

the second cross bracket is connected to the second end of the first upper rail and the second end of the third upper rail;

the third cross bracket is connected to the first end of the second upper rail and the first end of the fourth upper rail; and the fourth cross bracket is connected to the second end of the second upper rail and the second end of the fourth upper rail.

10. The rail and carrier system of claim 9 wherein:

a portion of the first upper rail is always positioned on a first side of a longitudinal centerline of the motor vehicle;

a portion of the third upper rail is always positioned on the first side of the longitudinal centerline of the motor vehicle;

a portion of the second upper rail is always positioned on a second side of the longitudinal centerline of the motor vehicle; and a portion of the fourth upper rail is always positioned on the second side of the longitudinal centerline of the motor vehicle.

11. The rail and carrier system of claim 10 further comprising:

a first cover connected to and extending between the first and second cross brackets;

a second cover connected to and extending between the third and fourth cross brackets;

wherein the first and second front strikers and first and second rear strikers extend upward through openings in the first cover; and wherein the third and fourth front strikers and third and fourth rear strikers extend upward through openings in the second cover.

12. The rail and carrier system of claim 8 wherein the first removable seat is attached to the first and second front strikers and the first and second rear strikers.

13. The rail and carrier system of claim 12 wherein the second removable seat is attached to the third and fourth front strikers and the third and fourth rear strikers.

14. A rail and carrier system for a removable seat for a motor vehicle, comprising:

a first lower rail fixedly attached to and positioned laterally along a floor of the motor vehicle;

a first upper rail nested with and laterally slidable within the first lower rail;

a second lower rail positioned laterally along the floor of the motor vehicle parallel to the first lower rail and longitudinally rearward of the first lower rail;

a second upper rail nested with and laterally slidable within the second lower rail;

first and second cross brackets laterally spaced apart and arranged perpendicular to the first and second upper rails, the first and second cross brackets being connected to the first and second upper rails;

a cover connected to and extending between the first and second cross brackets;

a first front striker attached to a top of a longitudinally forward portion of the first cross bracket;

a second front striker attached to a top of a longitudinally forward portion of the second cross bracket;

a first rear striker attached to a top of a longitudinally rearward portion of the first cross bracket;

a second rear striker attached to a top of a longitudinally rearward portion of the second cross bracket; and wherein the first and second front strikers and first and second rear strikers extend upward through openings in the cover.

15. The rail and carrier system of claim 14 wherein the removable seat is attached to the first and second front strikers and the first and second rear strikers.

* * * * *